US012253011B2

United States Patent
Lin et al.

(10) Patent No.: US 12,253,011 B2
(45) Date of Patent: Mar. 18, 2025

(54) FLEXIBLE POWER PLANT BASED ON SUPERCRITICAL CARBON DIOXIDE POWER CIRCULATION IN COMBINATION WITH SEAWATER DESALINATION AND CONTROL METHOD OF SAME

(71) Applicants: CHINA THREE GORGES CORPORATION, Beijing (CN); CENTRAL SOUTH UNIVERSITY, Changsha (CN)

(72) Inventors: Xinxing Lin, Beijing (CN); Likun Yin, Beijing (CN); Qian Wang, Beijing (CN); Wen Su, Changsha (CN)

(73) Assignees: CHINA THREE GORGES CORPORATION (CN); CENTRAL SOUTH UNIVERSITY (CN)

( * ) Notice: Subject to any disclaimer, the term of this patent is extended or adjusted under 35 U.S.C. 154(b) by 0 days.

(21) Appl. No.: 18/258,832

(22) PCT Filed: Sep. 28, 2021

(86) PCT No.: PCT/CN2021/121402
§ 371 (c)(1),
(2) Date: Jun. 22, 2023

(87) PCT Pub. No.: WO2022/037711
PCT Pub. Date: Feb. 24, 2022

(65) Prior Publication Data
US 2024/0295180 A1 Sep. 5, 2024

(30) Foreign Application Priority Data

Dec. 28, 2020 (CN) .......................... 202011578173.3
Dec. 28, 2020 (CN) .......................... 202023213436.9

(51) Int. Cl.
*F01K 25/10* (2006.01)
*C02F 1/06* (2023.01)
(Continued)

(52) U.S. Cl.
CPC .............. *F01K 25/103* (2013.01); *F01K 7/32* (2013.01); *F01K 23/064* (2013.01); *C02F 1/06* (2013.01); *C02F 2103/08* (2013.01)

(58) Field of Classification Search
CPC ........ F01K 25/103; F01K 7/32; F01K 23/064; C02F 1/06; C02F 2103/08
See application file for complete search history.

(56) References Cited

U.S. PATENT DOCUMENTS 4,302,297 A * 11/1981 Humiston ................. C02F 1/16
   202/205
8,359,861 B2 * 1/2013 Tamaura ................. F24S 10/70
   60/641.11

(Continued)

*Primary Examiner* — Hoang M Nguyen

(57) ABSTRACT

A flexible power plant based on supercritical carbon dioxide power circulation is provided. The plant includes a heat source circulation system, a thermodynamic circulation system, a desalination system and a control system. The heat source circulation system is connected to the thermodynamic circulation system and the seawater desalination system, and provides heat source required for their operations, respectively; the control system is simultaneously connected to respective actuators of the heat source circulation system, the thermodynamic circulation system and the seawater desalination system, and controls their operations, correspondingly.

9 Claims, 9 Drawing Sheets

(51) Int. Cl.
    *C02F 103/08*     (2006.01)
    *F01K 7/32*     (2006.01)
    *F01K 23/06*     (2006.01)

(56) References Cited

U.S. PATENT DOCUMENTS

| | | | |
|---|---|---|---|
| 10,829,913 B1 * | 11/2020 | Ahmed | B01D 61/025 |
| 11,311,818 B1 * | 4/2022 | Almatrafi | B01D 5/0087 |
| 2018/0171768 A1 * | 6/2018 | Tiffany, III | C02F 9/00 |
| 2023/0127569 A1 * | 4/2023 | Forrest | B01D 53/58 |
| | | | 60/39.52 |

* cited by examiner

FLEXIBLE POWER PLANT BASED ON SUPERCRITICAL CARBON DIOXIDE POWER CIRCULATION IN COMBINATION WITH SEAWATER DESALINATION AND CONTROL METHOD OF SAME

FIELD

The present invention pertains to the technical field of thermal energy power and seawater desalination, and relates to a comprehensive utilization system of thermal energy, in particular to a highly-flexible electricity-water co-production system composed of a flexible thermodynamic system based on supercritical carbon dioxide (S—CO2) cycle and a multi-stage desalination system based on energy cascade utilization, and an operation method thereof.

BACKGROUND

High-proportion grid-connection of clean energy presents a great situation of production and consumption for the energy outside the grid. At present, due to very low scale of energy storage configuration and inability to achieve comprehensively adjusting power systems yet, a large number of thermal power plants need to be involved in the adjustment. In the light of the future planning about involvement ratios of various energy in each country, highly-flexible thermal power plants will be used as the most basic adjusting way, coexisting with other clean energy sources for a long time. In order to make full use of steam energy, the turbine used in a steam power circulation generally adopts multi-stage expansion, especially its vane size increases stage by stage with decrease in the pressure and density of steam during the expansion process. Currently, the high-efficient water vapor turbine may have more than 50 stages, therefore its huge size and thermal inertia is not conducive to adjustment. In order to achieve adjusting output, it is necessary to adopt low-pressure deflation, but this way wastes a lot of useful energy.

Compared with water as a working medium of a traditional steam Rankine circulation, $CO_2$ has a low point of transition, and easily achieves a supercritical state. In the supercritical region, $CO_2$ has many advantages in thermal performance. In the respect of heat transfer performance, its density is close to liquid, and has high heat transfer efficiency; in the respect of dynamic performance: its viscosity is close to gas, and has good diffusivity, strong fluidity, and excellent ability to do work. The performance characteristics of $CO_2$ enables the S—$CO_2$ Brayton circulation to adapt to a wider temperature range and higher system cycle efficiency. In addition, the S—$CO_2$ Brayton circulation is compact in structure, small in volume and light in weight. Under the same conditions as power generation capacity, the turbine size for the S—$CO_2$ Brayton circulation is $\frac{1}{30}$ of the steam power generation system. Therefore, the S—$CO_2$ Brayton circulation has more advantages in quick start-up, emergency response and energy efficiency, especially in the case that it serves as a peak-shaving power plant, its advantage in operation economy is significantly higher than the steam circulation, so that it is expected to become a next generation technology of high-efficient and economical thermodynamic power generation.

In order to enhance the efficiency of the S—$CO_2$ Brayton circulation, thermodynamic processes such as back heating, reheating, multi-stage compression, and intermediate cooling, from which various improved forms of the S—$CO_2$ Brayton circulation are derived, are applied to the S—$CO_2$ Brayton circulation. However, at present, circulation structures mostly adopt a fixation form, and due to the high close association degree between each process, flow adjustment and split-flow ratio adjustment dominate adjustment for systems. This also limits the adjustment range for systems with inability for the turbine to exert the high efficiency and flexibility potential. In addition, in responding to the need to flexibly adjust power plants, the heat release process of systems will also fluctuate in a wide range with the change of the heat absorption of and efficiency of systems, correspondingly a large amount of low-grade heat energy generate. A seawater desalination process in a thermodynamic circulation provides a good flexible load, which is applied to cooperate with the early stage of the construction of the new thermal power plant, enabling an effective enhancement to the energy efficiency and economy of systems.

There is a great deficiency of freshwater resources in China, the per capita occupancy of which is only 25% of the world average, and the distribution of the freshwater resources in China presents a gradual decrease from southeast to northwest. Nearly 400 of 661 cities in China are subjected to insufficient water supply, among them, 110 cities severely lack water; 30 among the cities with a population of more than one million are stranded with the lack of water; among them, the shortage of water resources in North China has become a major obstacle restricting the development of the national economy. In addition, more than 100 countries in the world lack water to a different extent, among them, 28 are listed as the countries which severely lack water and buying water to live occurs in many countries. Seawater desalination technology is an important way for freshwater production in future, mainly including three technical routes such as multi-stage flash distillation, multiple effect evaporation and reverse osmosis. Since the multi-stage flash distillation can be applied to a lower temperature range, it widely makes use of the low-grade heat that is difficultly utilized in industrial processes, accounting for more than 60% of the market share for seawater desalination.

At present, installing a multi-stage flash desalination device at the terminal end of a thermal power production process is a quite proven technology. In order to further reduce the exhaust temperature of the heat source, enhance the utilization rate of high-grade heat, and improve the flexible output of the thermal power plant, simply installing a seawater desalination device at the terminal end of the traditional thermodynamic circulation process cannot meet the actual needs. On the one hand, the flexibility of the thermodynamic circulation itself needs to improve, and the desalination process corresponding to it should also be integrally configured. In the case that a new S—$CO_2$ power circulation process is applied to power generation, brought with a decrease in exhaust temperature of boilers, the circulating thermal efficiency on the side of seawater desalination needs to be further raised to reduce the costs in the whole life cycle of the desalination process.

SUMMARY

The present invention provides an integrated process based on supercritical carbon dioxide power circulation in combination with seawater desalination, which can reduce the exhaust temperature of the heat source, enhance the thermal efficiency of the thermodynamic circulation, improve the flexibility and adjustability of the output of the thermal power plant, and correspondingly raise the utilization efficiency of the low-temperature dynamic heat source in the seawater desalination process, so that it serves as a standing "flexible load" of the power plant, and further enhance the overall efficiency and flexibility of the power plant.

In order to achieve the above object, the present invention adopts the following technical solutions: a flexible power plant based on supercritical carbon dioxide power circulation in combination with seawater desalination, comprising a heat source circulation system, a thermodynamic circulation system, a desalination system and a control system;

wherein the heat source circulation system is connected to the thermodynamic circulation system and the seawater desalination system, and provides heat source required for their operations, respectively;

the control system is simultaneously connected to respective actuators of the heat source circulation system, the thermodynamic circulation system and the seawater desalination system, and controls their operations, correspondingly.

The heat source circulation system includes a boiler, a heat storing tank, a $CO_2$ heater, a $CO_2$ preheater, a seawater heater, a $2^{nd}$ bypass valve, a $6^{th}$ 3-way valve, a $7^{th}$ 3-way valve, a $8^{th}$ 3-way valve, a $9^{th}$ 3-way valve, a $10^{th}$ way valve, a $11^{th}$ 3-way valve, a $12^{th}$ 3-way valve, a $13^{th}$ 3-way valve, a first intermediate working medium pump, a second intermediate working medium pump and accessory pipelines;

the boiler is an original heat source of the heat source circulation system, the boiler is connected in series with the $CO_2$ heater and the $CO_2$ preheater, and provides heat for the thermodynamic circulation system: the boiler is connected to the seawater heater and provides heat for the desalination system;

the heat storing tank is connected in parallel on both sides of the in-series heat exchanger group composed of the $CO_2$ heater and the $CO_2$ preheater to adjust a mismatch between thermal inertia and the load of the $CO_2$ heater and the $CO_2$ preheater in the heat exchange process of the boiler;

the first intermediate working medium pump and the second intermediate working medium pump are connected to the thermodynamic circulation system and the heat storing tank, respectively, and are used to adjust the flow allocation of the thermodynamic circulation system and the heat storing tank, respectively; the $12^{th}$ 3-way valve, the $13^{th}$ 3-way valve and the $2^{nd}$ bypass valve are connected in parallel with the second intermediate working medium pump, and achieve absorbing and releasing from into the heat storing tank and adjusting flow volume;

the $8^{th}$ 3-way valve and the $9^{th}$ 3-way valve are used to bypass the high-temperature side of the $CO_2$ heater and the $10^{th}$ way valve and the $11^{th}$ three-way valve are used to bypass the high-temperature side of the $CO_2$ preheater, so as to achieve flexibly controlling thermodynamic circulation in a wide range.

The heat storing material of the heat storing tank is selected from a molten salt or liquid metal, which stores part of heat in the heat storing tank based on the requirements of the power system, when the power system declines and the heat of the boiler cannot be quickly adjusted, and which extracts the heat stored in the heat storing tank to supplement the power circulation with heat, when the power system rises and the heat of the boiler cannot be quickly adjusted:

the $CO_2$ heater, the $CO_2$ preheater and the seawater heater are directly installed inside the boiler, replacing an intermediate medium to directly heat $CO_2$ or seawater.

The thermodynamic circulation system includes a $CO_2$ heater, a $CO_2$ preheater, a first-stage expander, a second-stage expander, a first-stage compressor, a second-stage compressor, a first-stage back heater, a second-stage back heater, a $CO_2$ cooler 5, a $1^{st}$ bypass valve, a $1^{st}$ 3-way valve, $2^{nd}$ 3-way valve, $3^{rd}$ 3-way valve, $4^{th}$ 3-way valve, $5^{th}$ 3-way valve and accessory pipelines;

the thermodynamic circulation system uses $CO_2$ as a working medium, and has two built-in supercritical $CO_2$ Brayton circulations, including a first-stage supercritical $CO_2$ Brayton circulation and a second-stage supercritical $CO_2$ Brayton circulation; the $CO_2$ heater provides heat for the first-stage supercritical $CO_2$ Brayton circulation, and then the $CO_2$ preheater provides heat for the second-stage supercritical $CO_2$ Brayton circulation through, enabling the first-stage supercritical $CO_2$ Brayton circulation and the second-stage supercritical $CO_2$ Brayton circulation to indirectly combine with each other and energy to get utilized stage by stage.

The circulating working medium of the first-stage supercritical $CO_2$ Brayton circulation is supercritical $CO_2$, and the $CO_2$ working medium successively flows via the first-stage compressor, the low-temperature side of the second-stage back heater, the low-temperature side of the first-stage back heater, the low-temperature side of the $CO_2$ heater, the first-stage expander, the high-temperature side of the first-stage back heater, the $1^{st}$ 3-way valve, the high-temperature side of the second-stage back heater, the $2^{nd}$ 3-way valve, the high-temperature side of the $CO_2$ cooler and the first-stage compressor, so as to complete the circulation, the $CO_2$ fluid in correspondence to the above processes successively passes through several processes of raising pressure, absorbing heat, absorbing heat, absorbing heat, expansion, releasing heat, flow converging, releasing heat, flow splitting, releasing heat and raising pressure, so as to achieve the overall process of absorbing heat and doing work;

the first-stage and second-stage supercritical $CO_2$ Brayton circulations realize their direct combination by means of the $1^{st}$ 3-way valve, the $2^{nd}$ 3-way valve and the second-stage back heater, adjusts the split-flow ratio of the two circulations by means of the $1^{st}$ 3-way valve and the $2^{nd}$ 3-way valve to coordinate the operation of the thermodynamic circulation system;

the $1^{st}$ 3-way valve, the $2^{nd}$ 3-way valve and the $1^{st}$ bypass valve are used to bypass the second-stage supercritical $CO_2$ Brayton circulation, so that the first-stage supercritical $CO_2$ Brayton circulation operates independently; the $3^{rd}$ 3-way valve, the $4^{th}$ 3-way valve, and the $5^{th}$ 3-way valve are used to bypass the first-stage supercritical $CO_2$ Brayton circulation, so that the second-stage supercritical $CO_2$ Brayton circulation operates independently;

a transmission and a clutch are used to connect the first-stage expander, the second-stage expander, the first-stage compressor and the second-stage compressor to meet adjustment conditions: a heat exchanger with a printed circuit board is used in the $CO_2$ heater, the $CO_2$ preheater, the first-stage back heater, the second-stage back heater, and the $CO_2$ cooler.

The desalination system includes a $CO_2$ cooler, a seawater heater, a seawater preheater, a steam condenser, a first-stage flash evaporator, a middle-stage flash evaporator, a final-stage flash evaporator, a fresh water storing tank, a $14^{th}$ 3-way valve, a $15^{th}$ 3-way valve, a $16^{th}$ 3-way valve, a $17^{th}$ 3-way valve, a fresh water pump, a first-stage seawater pump, a second-stage seawater pump, a third-stage seawater pump, a fourth-stage seawater pump and accessory pipelines;

the seawater heater, the seawater preheater, and the steam condenser use a shell-and-tube heat exchanger with high corrosion and blockage resistance, low requirements for pressure, and good economy, and the heat exchanger pipe group in the heat exchanger is made of copper pipes;

the heat for heating seawater comes from three sources, including the condensation heat carried by the flashed seawater recycled via the steam condenser, the middle-stage flash evaporator and the first-stage flash evaporator, the cooled heat recycled from the terminal of the thermodynamic circulation via seawater preheater, and the waste heat of the recycled flue gas in the heat source circulation via the seawater heater, among them the demineralized water successively flows through the fresh water pump, the low-temperature side of the $CO_2$ cooler, the high-temperature side of the seawater preheater, and the fresh water pump, correspondingly finishing the circulation process of raising pressure, absorbing heat, releasing heat and raising pressure, and transmits the heat released from cooling at the terminal end of the thermodynamic circulation indirectly to seawater, among them the demineralized water circulation is mainly to protect the printed circuit board heat exchanger used in the $CO_2$ cooler, or to apply a simplified system, in which the cooled heat from the terminal end of the power circulation is directly used to heat seawater by means of a heat exchanger;

natural low-temperature seawater is extracted to successively flow from the low-temperature side of the steam condenser, the low-temperature condenser in the middle-stage flash evaporator, the low-temperature condenser in the first-stage flash evaporator and the first-stage seawater pump to the $14^{th}$ 3-way valve, the low-temperature side of the seawater preheater, the low-temperature side of the seawater heater, the first seawater tank of the first-stage flash evaporator, the second-stage seawater pump, the second seawater tank of the middle-stage flash evaporator, the third-stage seawater pump, the grilles of the water distributor of the final-stage flash evaporator and the third seawater tank, then is discharged from the fourth-stage seawater pump to finish concentrating seawater, and the $CO_2$ fluid in correspondence to the above processes successively passes through several processes of absorbing heat, absorbing heat, absorbing heat, raising pressure, flow splitting, absorbing heat, absorbing heat, flash concentration, raising pressure, flash concentration, raising pressure, dilatate flash concentration and raising pressure, so as to achieve the processes of absorbing heat and low-pressure flash concentration.

The first-stage flash evaporator is composed of five parts: a first housing, a first low-temperature condenser, a first condensate water pan, the first seawater tank, and the second-stage seawater pump, the first-stage flash evaporator includes 6 interfaces, that is, a first low-temperature seawater inlet, a first low-temperature seawater outlet, a first water vapor outlet, a first fresh water outlet, a first high-temperature seawater inlet and a first high-temperature seawater outlet, among them, pebbles piled in the first seawater tank enhance gas velocity, and the first fresh water outlet led from the bottom of the first condensate water pan is used to discharge condensate water;

the water vapor flashed from the first-stage flash evaporator contacts the first low-temperature condenser in the first-stage flash evaporator, then condenses into fresh water, which is collected by the first condensate water pan in the first-stage flash evaporator, and finally flows convergently in the fresh water storing tank; the rest steam flows into the middle-stage flash evaporator and mixes with the water vapor flashed from the middle-stage flash evaporator, then contacts the low-temperature condenser in the middle-stage flash evaporator, and condenses into fresh water, which is collected by the second condensate water pan in the middle-stage flash evaporator, and finally flows convergently in the fresh water storing tank; the remaining steam mixes with the water vapor flashed from the dilated final-stage flash evaporator via the $15^{th}$ 3-way valve, then enters the high-temperature side of the steam condenser to release heat and condense into fresh water, which finally flows into the fresh water storing tank;

the middle-stage flash evaporator is composed of five parts: a second housing, a second low-temperature condenser, a second condensate water pan, the second seawater tank, and the third-stage seawater pump, and the middle-stage flash evaporator includes 6 interfaces, that is, a second low-temperature seawater inlet, a second low-temperature seawater outlet, a second water vapor outlet, a second fresh water outlet, a second high-temperature seawater inlet and a second high-temperature seawater outlet, among them, pebbles piled in the second seawater tank enhance gas velocity, and the second fresh water outlet led from the bottom of the second condensate water pan is used to discharge condensate water; the middle-stage flash evaporator is different from the first-stage flash evaporator in the respect of its increase or decrease in number according to the desalination process, and the second seawater tank in the middle-stage flash evaporator can be equipped with a flue gas remaining heat recycling device according to the desalination process, which utilizes the flue gas discharged from the high-temperature side of the seawater heater.

The final-stage flash evaporator is composed of six parts: a third housing, a fan, the water distributor, the grilles, the third seawater tank, and the third-stage seawater pump, and the fan is used to enhance disturbance and raise the evaporation rate of seawater on the surface of the grilles;

the fresh water storage tank is provided with a sealed chamber, the upper part of which is equipped with an exhaust valve to regularly provide negative pressure for the fresh water side of the desalination process;

the middle-stage flash evaporator can increase or decrease in number according to the evaporation volume required by the process, and the $15^{th}$ 3-way valve, the $16^{th}$ 3-way valve and the $17^{th}$ three-way valve are used to bypass the final-stage flash evaporator.

The control system includes a $1^{st}$ 3-way valve, a $2^{nd}$ 3-way valve, a $3^{rd}$ 3-way valve, a $4^{th}$ 3-way valve, a $5^{th}$ 3-way valve, a $6^{th}$ 3-way valve, a $7^{th}$ 3-way valve, a $8^{th}$ 3-way valve, a $9^{th}$ 3-way valve, a $10^{th}$ way valve, a $11^{th}$ 3-way valve, a $12^{th}$ 3-way valve, a $13^{th}$ 3-way valve, a $14^{th}$ 3-way valve, a $15^{th}$ 3-way valve, a $16^{th}$ 3-way valve, a $17^{th}$ 3-way valve, a first bypass valve, a second bypass valve, a first intermediate working medium pump, a second intermediate working medium pump, a first-stage seawater pump, a second-stage seawater pump, a third-stage seawater pump, a fourth-stage seawater pump, a frequency conversion actuator equipped for compressors, a controller and accessory power electronics facilities.

A operation method of the flexible power plant based on supercritical carbon dioxide power circulation in combination with seawater desalination, comprising:

Operating Mode 1 being selected by the power plant, when a power grid requires the power plant to operate at a full load,
at this time, the power grid requires the power plant to output at a full load or the power plant actively enters a highest output mode at a highest electricity price, while the seawater desalination process enters a minimal power consumption mode; wherein the controller adjusts actuators such as various valves and pumps and existing pipelines to achieve the process steps of enabling the boiler to provide heat for the first-stage supercritical $CO_2$ Brayton circulation by means of the $CO_2$ heater and provide heat for the second-stage supercritical $CO_2$ Brayton circulation by means of the $CO_2$ preheater, and the first-stage and second-stage supercritical $CO_2$ Brayton circulations to jointly operate and share the second-stage back heater, so as to achieve the flow allocation of the two Brayton circulations via the $1^{st}$ 3-way valve and the $2^{nd}$ 3-way valve, enabling one part of the heat source used in the desalination process comes from a low-grade heat source that cannot be utilized by the thermodynamic circulation to transmit to seawater via the $CO_2$ cooler and the seawater preheater, and the other part as the flue gas discharged by the boiler to further raise the seawater's temperature via the seawater heater, and meanwhile enabling the first-stage flash evaporator and the middle-stage flash evaporator to acting as a water vapor generating device; wherein, in this operating mode, the output of the thermodynamic system can be adjusted within a reasonable range by means of the boiler, the heat storing tank and the $CO_2$ circulation flow;

Operating Mode 2 being selected by the power plant, when a power grid requires the power plant to reduce output,
at this time, the power grid requires the power plant to reduce output or the power plant actively enters a higher output mode at a higher electricity price, while the seawater desalination process enters a median power consumption mode; wherein the controller adjusts actuators such as various valves and pumps and existing pipelines to achieve the process steps of enabling the boiler to provide heat for the first-stage supercritical $CO_2$ Brayton circulation by means of the $CO_2$ heater and the second-stage supercritical $CO_2$ Brayton circulation to be bypassed, enabling one part of the heat source used in the desalination process comes from a low-grade heat source that cannot be utilized by the thermodynamic circulation to transmit to seawater via the $CO_2$ cooler and the seawater preheater, and the other part as the flue gas discharged by the boiler to further raise the seawater's temperature via the seawater heater, meanwhile enabling the first-stage flash evaporator, the middle-stage flash evaporator and the final-stage flash evaporator to acting as a water vapor generating device, and enabling the fan in the final-stage flash evaporator to be in a constant closing state; wherein, in this operating mode, the output of the thermodynamic system can be adjusted within a reasonable range by means of the boiler, the heat storing tank and the $CO_2$ circulation flow, meanwhile seawater flow appropriately increases to enhance freshwater production;

Operating Mode 3 being selected by the power plant, when a power grid requires the power plant to continue reducing output.
at this time, the power grid requires the power plant to further reduce output or the power plant actively enters a low output mode at a median electricity price, while the seawater desalination process enters a median power consumption mode; wherein the controller adjusts actuators such as various valves and pumps and existing pipelines to achieve the process steps of enabling the boiler to provide heat for the first-stage supercritical $CO_2$ Brayton circulation by means of the $CO_2$ heater, the second-stage supercritical $CO_2$ Brayton circulation to be bypassed, and the second-stage back heater further to be bypassed based on Operating Mode 2, enabling one part of the heat source used in the desalination process comes from a low-grade heat source that cannot be utilized by the thermodynamic circulation to transmit to seawater via the $CO_2$ cooler and the seawater preheater, and the other part as the flue gas discharged by the boiler to further raise the seawater's temperature via the seawater heater, meanwhile enabling the first-stage flash evaporator, the middle-stage flash evaporator and the final-stage flash evaporator to acting as a water vapor generating device, and enabling the fan in the final-stage flash evaporator to be in a constant closing state; wherein, in this operating mode, the output of the thermodynamic system can be adjusted within a reasonable range by means of the boiler, the heat storing tank and the $CO_2$ circulation flow, meanwhile seawater flow appropriately increases to enhance freshwater production; and Operating Mode 4 being selected by the power plant, when a power grid requires the power plant to operate in the lowest load state,
at this time, the power grid requires the power plant to output in a low load state or the power plant actively enters a lowest output mode at a low electricity price, while the seawater desalination process enters a lowest power consumption mode; wherein the controller adjusts actuators such as various valves and pumps and existing pipelines to achieve the process steps of enabling the boiler to provide heat for the second-stage supercritical $CO_2$ Brayton circulation by means of the $CO_2$ preheater, the original system to rebuild into the second-stage supercritical $CO_2$ Brayton circulation overlapping the $CO_2$ cooling circulation, and the first-stage supercritical $CO_2$ Brayton circulation to be bypassed, enabling one part of the heat source used in the desalination process comes from a low-grade heat source that cannot be utilized by the thermodynamic circulation to transmit to seawater via the $CO_2$ cooler and the seawater preheater, and the other part as the flue gas discharged by the boiler to further raise the seawater's temperature via the seawater heater, meanwhile enabling the first-stage flash evaporator, the middle-stage flash evaporator and the final-stage flash evaporator to acting as a water vapor generating device, and enabling the fan in the final-stage flash evaporator to be in a constant closing state; wherein, in this operating mode, the output of the thermodynamic system can be adjusted within a reasonable range by means of the boiler, the heat storing tank and the $CO_2$ circulation flow, meanwhile freshwater production further rises.

1. The supercritical $CO_2$ Brayton circulation according to the present invention differs from the traditional back heating circulation, reheating circulation, recompression circulation, intermediate cooling and suchlike, the improved type of the traditional supercritical $CO_2$ Brayton circulation includes split-flow in a low-pressure state and converge-flow in a high-pressure state; but the supercritical $CO_2$ Brayton circulation according to the present invention includes split-flow in a low-pressure state and converge-flow in a low-pressure state, and provides a third-stage pressure which can be adjusted within a certain range, in addition to the traditional operation under the high and low pressure, so the adjustability of $CO_2$ compression and expansion equipment for can be more fully utilized, so as to greatly improve the flexibility of system's output.

2. The seawater desalination system according to the present invention has improved based on the traditional multi-stage flash distillation system, the improvement is to first fill the first-stage flash evaporator and the middle-stage flash evaporator with pebbles to increase the speed of water vapor generation, then apply air conditioning cooling tower technology in the final-stage flash evaporator, next combine water distributors, grilles and fans to raise the energy consumption, so as to increase the speed of water vapor generation in the low-temperature range.

3. The present invention fully exerts the advantages of the small size and strong adjustable capacity of $CO_2$ compression and expansion equipment with the assistance of an adjustable desalination system, so that it not only can achieve an adjustable wide range of the thermal power generation system, but also provides a continuously variable heat load for the excessive heat generated in the adjustment process and the heat that cannot be utilized by the power plant itself, so as to further raise the economic benefits of thermodynamic power generation, and to be applied to the desalination for other bitter water in addition to seawater desalination.

4. The scenario to which Operating Mode 1 according to the present invention adapts is that when the power grid requires the power plant to operate at a full load or the highest electricity price, the first-stage and second-stage supercritical $CO_2$ Brayton circulation jointly operate, and the seawater desalination system operates by minimal power consumption, so as to cooperate with the grid's fluctuation or achieve a maximum economic benefit.

5. The scenario to which Operating Mode 2 according to the present invention adapts is that when the power grid requires the power plant to further reduce output or the power plant actively enters the higher output mode due to the electricity price at a higher level, the first-stage supercritical $CO_2$ Brayton circulation operates independently, and the seawater desalination process enters the operation with median power consumption, so as to cooperate with the grid's fluctuation or achieve a maximum economic benefit.

6. The scenario to which Operating Mode 3 according to the present invention adapts is that when the power grid requires the power plant to continue to reduce output or the power plant actively enters the lower output mode due to the electricity price at a median level, the first-stage supercritical $CO_2$ Brayton circulation operates independently and removes the second-stage back heating process, and the seawater desalination process enters the operation with median power consumption, so as to cooperate with the grid's fluctuation or achieve a maximum economic benefit.

7. The scenario to which Operating Mode 4 according to the present invention adapts is that when the power grid requires the power plant to output in a low load state or the power plant actively enters the lowest output mode due to the electricity price at a low level, the second-stage supercritical $CO_2$ Brayton circulation overlapping the $CO_2$ cooling circulation operates and the seawater desalination process enters the operation with the highest power consumption, so as to cooperate with the grid's fluctuation or achieve a maximum economic benefit.

BRIEF DESCRIPTION OF THE DRAWINGS

We will further describe the present invention in combination with the drawings and examples as follows.

Figure 1:
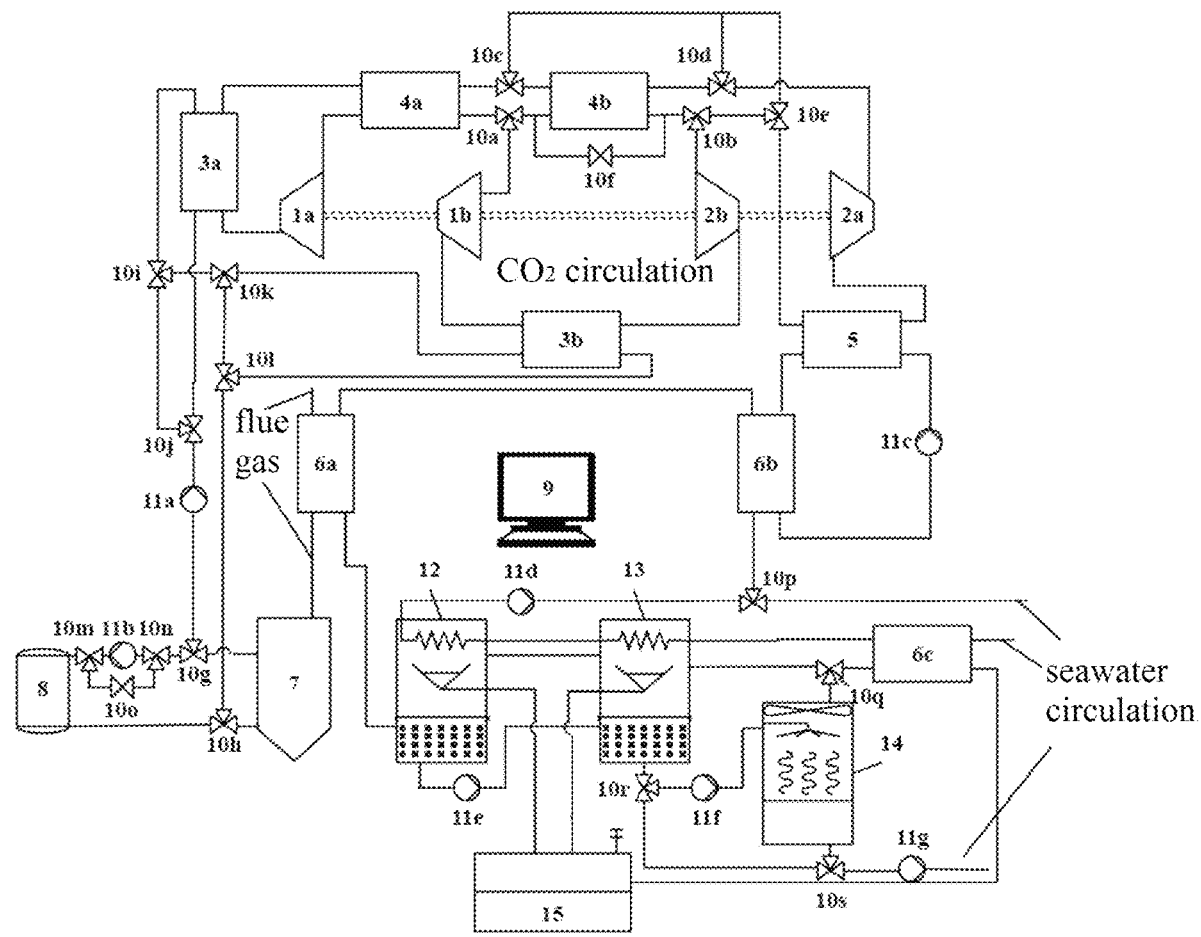
FIG. 1 shows the highly-flexible electricity-water co-production system based on supercritical carbon dioxide power circulation in combination with seawater desalination according to the present invention.

Where, 1$a$-first-stage expander; 1$b$-second-stage expander; 2$a$-first-stage compressor; 2$b$-second-stage compressor; 3$a$—$CO_2$ heater; 3$b$—$CO_2$ preheater; 4$a$-first-stage back heater; 4$b$-second-stage back heater; 5-$CO_2$ cooler; 6$a$-seawater heater; 6$b$-seawater preheater; 6$e$-steam condenser; 7-boiler; 8-heat storing tank; 9-controller; 10$a$-1$^{st}$ 3-way valve; 10$b$-2$^{nd}$ 3-way valve; 10$c$-3$^{rd}$ 3-way valve; 10$d$-4$^{th}$ 3-way valve; 10$e$-5$^{th}$ 3-way valve; 10$g$-6$^{th}$ 3-way valve; 10$h$-7$^{th}$ 3-way valve; 10$i$-8$^{th}$ 3-way valve; 10$j$-9$^{th}$ 3-way valve; 10$k$-10$^{th}$ way valve; 10$l$-11$^{th}$ 3-way valve; 10$m$-12$^{th}$ 3-way valve; 10$n$-13$^{th}$ 3-way valve; 10$p$-14$^{th}$ 3-way valve; 10$q$-15$^{th}$ 3-way valve; 10$r$-16$^{th}$ 3-way valve; 10$s$-17$^{th}$ 3-way valve; 10$f$-first bypass valve; 10$o$-second bypass valve; 11$a$-first intermediate working medium pump; 11$b$-second intermediate working medium pump; 11$e$-fresh water pump; 11$d$-first-stage seawater pump; 11$e$-second-stage seawater pump; 11$f$-third-stage seawater pump; 11$g$-fourth-stage seawater pump; 12-first-stage flash evaporator; 13-middle-stage flash evaporator; 14-final-stage flash evaporator; 15-freshwater storing tank; 21-first housing; 31-second housing; 41-third housing; 51-sealed chamber; 22-first low-temperature condenser; 32-second low-temperature condenser; 23-first condensate water pan; 33-second condensate water pan; 24-first seawater tank; 34-second seawater tank; 45-third seawater tank; 25$a$-first low-temperature seawater inlet; 35$a$-second low-temperature seawater inlet; 25b-first low-temperature seawater outlet; 35b-second low-temperature seawater outlet; 25c-first water vapor outlet; 35c-second water vapor outlet; 25d-first fresh water outlet; 35d-second fresh water outlet; 25e-first high-temperature seawater inlet; 35e-second high-temperature seawater inlet; 25f-first high-temperature seawater outlet; 35f-second high-temperature seawater outlet; 42-fan; 43-water distributor; 44-grille; 52-exhaust valve.

DETAILED DESCRIPTION

We will further describe the embodiments of the present invention in combination with the drawings as follows.

EXAMPLE 1

As shown in FIGS. 1-12, a highly-flexible electricity-water co-production system based on supercritical carbon dioxide power circulation in combination with seawater desalination includes: a heat source circulation system composed of the boiler 7, the heat storing tank 8, the $CO_2$ heater 3a, the $CO_2$ preheater 3b, the seawater heater 6a, the first intermediate working medium pump 11a and the second intermediate working medium pump 11b; a thermodynamic circulation system composed of the $CO_2$ heater 3a, the $CO_2$ preheater 3b, the first-stage expander 1a, the second-stage expander 1b, the first-stage compressor 2a, the second-stage compressor 2b, the first-stage back heater 4a, the second-stage back heater 4b and the $CO_2$ cooler 5; a desalination system composed of the $CO_2$ cooler 5, the seawater heater 6a, the seawater preheater 6b, the steam condenser 6c, the first-stage flash evaporator 12, the middle-stage flash evaporator 13, the final-stage flash evaporator 14, the fresh water storing tank 15, the fresh water pump 11c, the first-stage seawater pump 11d, the second-stage seawater pump 11e, the third-stage seawater pump 11f, the fourth-stage seawater pump 11g and other equipment; and a control system composed of the $1^{st}$ 3-way valve 10a, the $2^{nd}$ 3-way valve 10b, the $3^{rd}$ 3-way valve 10c, the $4^{th}$ 3-way valve 10d, the $5^{th}$ 3-way valve 10e, the $6^{th}$ 3-way valve 10g, the $7^{th}$ 3-way valve 10h, the $8^{th}$ 3-way valve 10i, the $9^{th}$ 3-way valve 10j, the $10^{th}$ way valve 10k, the $11^{th}$ 3-way valve 10l, the $12^{th}$ 3-way valve 10m, the $13^{th}$ 3-way valve 10n, the $14^{th}$ 3-way valve 10p, the $15^{th}$ 3-way valve 10q, the $16^{th}$ 3-way valve 10r, the $17^{th}$ 3-way valve 10s, the first bypass valve 10f, the second bypass valve 10o, each pump, the frequency conversion actuator matched with compressors, and the controller 9.

As shown in FIG. 1, the boiler 7 provides heat for the power circulation by means of the $CO_2$ heater 3a and $CO_2$ preheater 3b, the heat storing tank 8 is connected with the heating cycle pipeline in parallel, the second intermediate working medium pump 11b, the second bypass valve 10o, the $12^{th}$ 3-way valve and the $13^{th}$ 3-way valve are under the control to achieve heat storage and heat rise in the process of adjusting the power plant. The power circulation absorbs heat from the heat source by means of the $CO_2$ heater 3a and $CO_2$ preheater 3b, and realizes thermoelectric conversion through the supercritical $CO_2$ Brayton circulation, and achieves four main operating modes by means of the $1^{st}$ 3-way valve 10a, the $2^{nd}$ 3-way valve 10b, the $3^{rd}$ 3-way valve 10c, the $4^{th}$ 3-way valve 10d, the $5^{th}$ 3-way valve 10e, the $6^{th}$ 3-way valve 10g, the $7^{th}$ 3-way valve 10h, the $8^{th}$ 3-way valve 10i, the $9^{th}$ 3-way valve 10j, the $10^{th}$ way valve 10k and the $11^{th}$ 3-way valve 10l. Operating Mode 1 (the first-stage and second-stage supercritical $CO_2$ Brayton circulations jointly operate), Operating Mode 2 (the first-stage supercritical $CO_2$ Brayton circulation operates separately with two-stage back heating), Operating Mode 3 (the first-stage supercritical $CO_2$ Brayton circulation operates separately with one-stage back heating) and Operating Mode 4 (the second-stage supercritical $CO_2$ Brayton circulation operates separately); among them, the first-stage and second-stage supercritical $CO_2$ Brayton circulations jointly share the second-stage back heater 4b and allocate the flow volume passing through the $1^{st}$ 3-way valve 10a and the $2^{nd}$ 3-way valve 10b. When the power circulation operating mode changes or the output adjustment occurs in a fixation mode, the boiler 7 and the heat storing tank 8 cannot quickly respond to the change of the heat absorption and the heat release from waste heat in the power circulation, but requires the desalination system to adjust accordingly. The main heat source of the desalination process comes from the waste heat released by the power circulation passing through the seawater preheater 6b and the residual heat of boiler's flue gas passing through the seawater heater 6a, and the low-temperature seawater enables the energy utilization efficiency to further improve by recycling the condensation heat in flash evaporation devices. The core components of the water vapor generator used for the desalination process mainly includes the first-stage flash evaporator 12, the middle-stage flash evaporator 13, and the final-stage flash evaporator 14. Among them, the middle-stage flash evaporator 13 may increase or decrease in number according to loads, and the final-stage flash evaporator 14 includes the fan 42, which actively raises the evaporation rate, so the seawater desalination matched with it also has a three-stage operating mode: a low power consumption operating mode (the first-stage flash evaporator 12 and the middle-stage flash evaporator 13 jointly operate), a median power consumption operating mode (the first-stage flash evaporator 12, the middle-stage flash evaporator 13, the final-stage flash evaporator 14 and the fan 42 aren't turned on), a high power consumption operating mode (the first-stage flash evaporator 12, the middle-stage flash evaporator 13, the final-stage flash evaporator 14 and the fan 42 are turned on).

EXAMPLE 2

Figure 2:
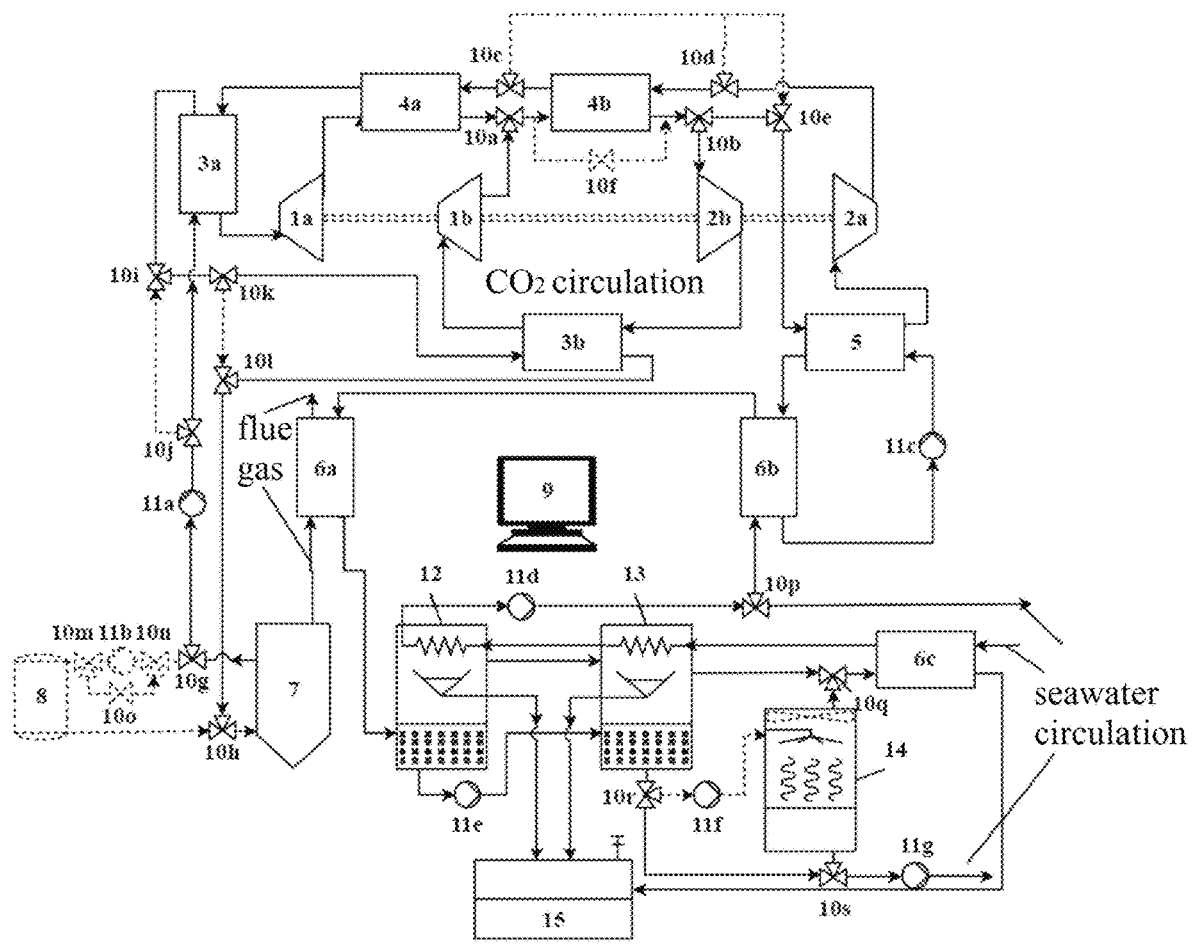
FIG. 2 is a schematic diagram of Operating Mode 1 of the electricity-water co-production system of the examples in the present invention.

As shown in FIG. 2, when the power grid requires the power plant to operate at a full load, the power plant selects Operating Mode 1.

At this time, the power grid requires the power plant to output at a full load or the power plant actively enters the highest output mode at the highest electricity price, while the seawater desalination process enters the lowest power consumption mode. As aforementioned, the controller 9 adjusts the actuators such as various valves and pumps and the existing pipelines to achieve the following process steps, the heat source outlet of the boiler 7 is connected to the high-temperature inlet of the $CO_2$ heater 3a, the high-temperature outlet of the $CO_2$ heater 3a is connected to the high-temperature inlet of the $CO_2$ preheater 3b, and the high-temperature outlet of the $CO_2$ preheater 3b is connected to the heat source inlet of the boiler 7, so as to complete the heat supply to the entire power circulation; at this time, the $CO_2$ heater 3a provides heat for the first-stage supercritical $CO_2$ Brayton circulation, and the $CO_2$ preheater 3b provides heat for the second-stage supercritical $CO_2$ Brayton circulation; among them, the circulating medium $CO_2$ of the first-stage supercritical $CO_2$ Brayton circulation, passes through the low-temperature inlet of the $CO_2$ heater 3a and is heated inside it, then enters the inlet of the first-stage expander 1a via the low-temperature outlet of the $CO_2$ heater 3a, expands inside it and outputs work, then enters the high-temperature inlet of the first-stage back heater 4a via the outlet of the first-stage expander 1a and releases excess heat inside it, then enters the inlet of the $1^{st}$ 3-way valve 10a via the high-temperature outlet of the first-stage back heater 4a and converges with the $CO_2$ coming from the second-stage supercritical $CO_2$ Brayton circulation inside it, then enters the high-temperature inlet of the second-stage back heater 4b via the outlet of the $1^{st}$ 3-way valve 10a and releases excess heat inside it, then enters the inlet of the $2^{nd}$ 3-way valve 10b via the high-temperature outlet of the second-stage back heater 4b, and splits into one stream carrying out the second-stage supercritical $CO_2$ Brayton circulation and the other stream which continues the first-stage supercritical $CO_2$ Brayton circulation, enters the high-temperature inlet of the $CO_2$ cooler 5 and releases excess heat inside it, then enters the inlet of the first-stage compressor 2a via the high-temperature outlet of the $CO_2$ cooler 5 and raises pressure under external work inside it, then enters the low-temperature inlet of the second-stage back heater 4b via the outlet of the first-stage compressor 2a and recycles the heat from the high-temperature side inside it, then enters the low-temperature inlet of the first-stage back heater 4a via the low-temperature outlet of the second-stage back heater 4b and recycles the heat from the high-temperature side inside it, then enters the low-temperature inlet of the $CO_2$ heater 3a via the low-temperature outlet of the first-stage back heater 4a and completes the first-stage supercritical $CO_2$ Brayton circulation; the circulating medium $CO_2$ of the second-stage supercritical $CO_2$ Brayton circulation splits inside the $2^{nd}$ 3-way valve 10b, that is, except for one stream entering the first-stage supercritical $CO_2$ Brayton circulation, the rest stream enters the inlet of the second-stage compressor 2b and raises pressure under external work inside it, then enters the low-temperature inlet of the $CO_2$ preheater 3b via the outlet of the second-stage compressor 2b and is heated inside it; then enters the inlet of the second-stage expander 1b via the low-temperature outlet of $CO_2$ preheater 3b, expands inside it and outputs work, then enters the inlet of the $1^{st}$ 3-way valve 10a via the outlet of the second-stage expander 1b and converges with the $CO_2$ coming from the first-stage supercritical $CO_2$ Brayton circulation inside it; then enters the high-temperature inlet of the second-stage back heater 4b via the outlet of the $1^{st}$ 3-way valve 10a and releases excess heat inside it, then enters the inlet of the $2^{nd}$ 3-way valve 10b via the high-temperature outlet of the second-stage back heater 4b, and splits into one stream carrying out the first-stage supercritical $CO_2$ Brayton circulation and the other stream which continues the second-stage supercritical $CO_2$ Brayton circulation, enters the inlet of the second-stage compressor 2b to complete the second-stage supercritical $CO_2$ Brayton circulation inside it; the heat source used in the desalination process comes from a low-grade heat source that cannot be utilized by the thermodynamic circulation, the demineralized water enters the low-temperature inlet of the $CO_2$ cooler 5 via the outlet of the water pump 11o under the pressure boost of the freshwater pump 11e and absorbs the cooled heat emitted by the power circulation inside it, then enters the high-temperature inlet of the seawater preheater 6b via the low-temperature outlet of the $CO_2$ cooler 5 and transmits heat to the seawater inside it, then enters the inlet of the freshwater pump 11e via the high-temperature outlet of the seawater preheater 6b to complete the circulation: the flue gas discharged from the boiler 7 enters the high-temperature inlet of the seawater heater 6a, and release heat to heat the seawater, then is discharged from the high-temperature outlet of the seawater heater 6a; the original low-temperature seawater enters the low-temperature inlet of the steam condenser 6e, and recycles the condensation heat of the water vapor inside it, then enters the inlet 35a of the low-temperature condenser 33 in the middle-stage flash evaporator 13 via the low-temperature outlet of the steam condenser 6e and recycles the condensation heat of the water vapor inside it, then enters the inlet 25a of the low-temperature condenser 23 in the first-stage flash evaporator 12 via the outlet 35b of the low-temperature condenser 33 in the middle-stage flash evaporator 13, and recycles the condensation heat of water vapor inside it, then enters the inlet of the first-stage seawater pump 11d via the outlet 25b of the low-temperature condenser 23 in the middle-stage flash evaporator 13, and raises pressure inside it, then enters (the excess seawater is discharged after split-flow via the $14^{th}$ 3-way valve 10p) the low-temperature inlet of the seawater preheater 6b via the outlet of the first-stage seawater pump 11d, and absorbs the cooled heat emitted by the power circulation inside it, then enters the low-temperature inlet of the seawater heater 6a via the low-temperature outlet of the seawater preheater 6b, and absorbs the remaining heat of the flue gas discharged from the boiler 7 inside it, then enters the inlet 25e of the first seawater tank 24 of the first-stage flash evaporator 12 via the low-temperature outlet of the seawater heater 6a and flashes inside it; the concentrated seawater enters the inlet of the second-stage seawater pump 11e via the bottom outlet 25f of the first seawater tank 24 of the first-stage flash evaporator 12 and raises pressure inside it, then enters the inlet 35e of the second seawater tank 34 of the middle-stage flash evaporator 13 via the outlet of the second-stage seawater pump 11e and flashes inside it, then enters the fourth-stage seawater pump 11g to be discharged via the bottom outlet 35f of the second seawater tank 34 of the middle-stage flash evaporator 13.

Wherein the flash steam in the first-stage flash evaporator 12 contacts the fresh water condensed by the low-temperature condenser 23 in the first-stage flash evaporator 12, which is collected by means of the condensate water pan 23 in the first-stage flash evaporator 12 and then enters the freshwater storing tank 15 via the outlet 25d of the condensate water pan 23, the uncondensed portion of the flash steam in the first-stage flash evaporator 12 enters the steam inlet of the middle-stage flash evaporator 13 via the steam outlet 25e of the first-stage flash evaporator 12, and mixes with the flash steam in middle-stage flash evaporator 13, then the steam contacts the low-temperature condenser 33 in the middle-stage flash evaporator 13 to condense the fresh water, which is collected by the condensate water pan 33 in the middle-stage flash evaporator 13, then enters the fresh water storing tank 15 from the outlet 35d of the condensate water pan 33, the uncondensed portion of the steam in the middle-stage flash evaporator 13 enters the high-temperature inlet of the steam condenser 6e from the steam outlet 35e of the middle-stage flash evaporator 13, and releases heat and condenses inside it, the condensed fresh water enters the fresh water storing tank 15 from the high-temperature outlet of the steam condenser 6c. In this operating mode, the output of the thermodynamic system can be adjusted within a reasonable range by means of the boiler 7, the heat storing tank 8 and the $CO_2$ circulation flow.

EXAMPLE 3

Figure 3:
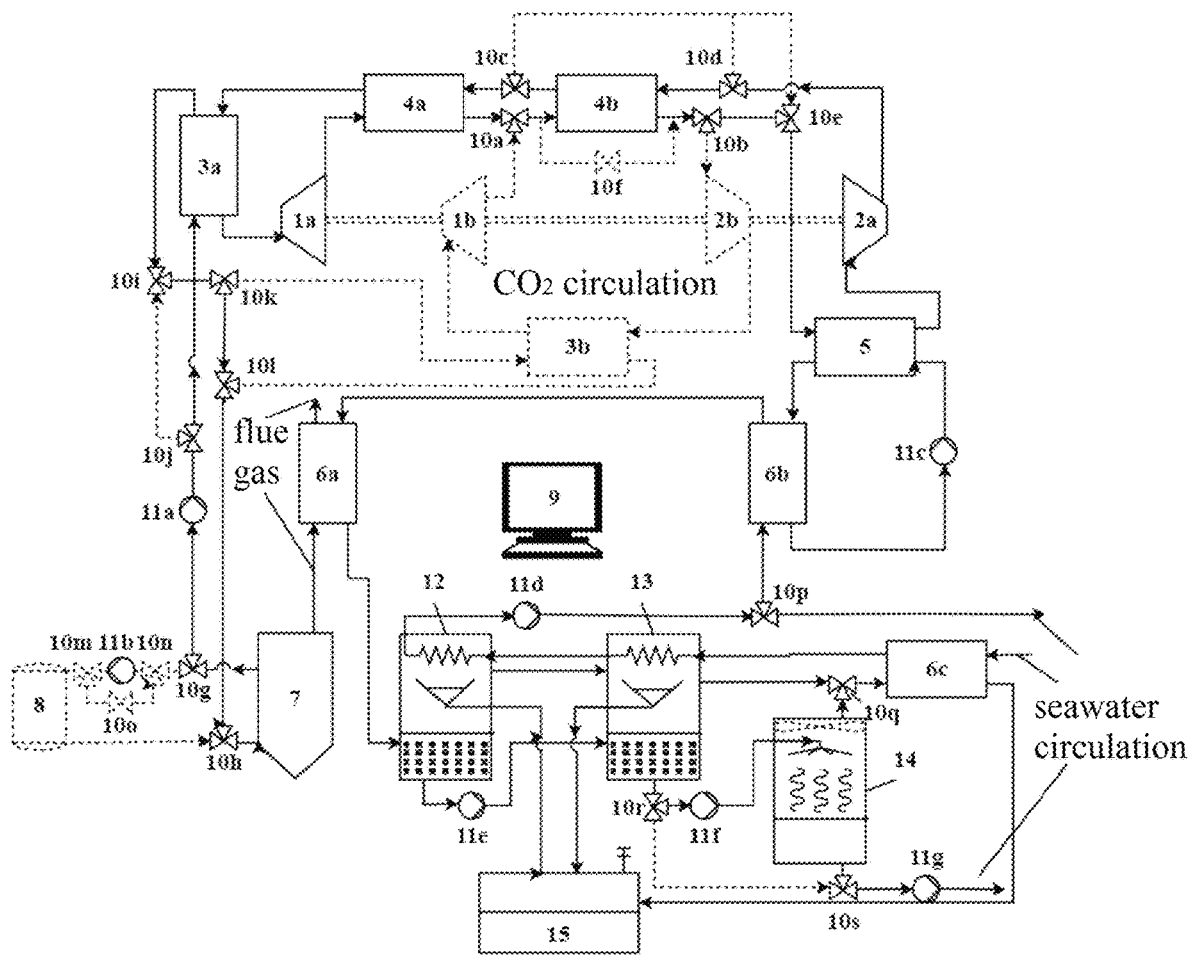
FIG. 3 is a schematic diagram of Operating Mode 2 of the electricity-water co-production system of the examples in the present invention.

As shown in FIG. 3, when the power grid requires the power plant to reduce output, the power plant selects Operating Mode 2.

At this time, the power grid requires the power plant to reduce output or the power plant actively enters the higher output mode at the higher electricity price, while the seawater desalination process enters the median power consumption mode. As aforementioned, the controller 9 adjusts the actuators such as various valves and pumps and the existing pipelines to achieve the following process steps, the heat source outlet of the boiler 7 is connected to the high-temperature inlet of the $CO_2$ heater 3a, the high-temperature outlet of the $CO_2$ heater 3a is connected to the heat source inlet of the boiler 7 (the interaction of the $11^{th}$ 3-way valve and the $12^{th}$ 3-way valve arising from the adjustment of the valve group directly bypasses the high-temperature side of the $CO_2$ preheater 3b) to complete providing heat for the entire power circulation; at this time, the $CO_2$ heater 3a provides heat for the first-stage supercritical $CO_2$ Brayton circulation, and the second-stage supercritical $CO_2$ Brayton circulation is bypassed; among them, the circulating medium $CO_2$ of the first-stage supercritical $CO_2$ Brayton circulation, passes through the low-temperature inlet of the $CO_2$ heater 3a and is heated inside it, then enters the inlet of the first-stage expander 1a via the low-temperature outlet of the $CO_2$ heater 3a, expands inside it and outputs work, then enters the high-temperature inlet of the first-stage back heater 4a via the outlet of the first-stage expander 1a and releases excess heat inside it, then enters the high-temperature inlet of the second-stage back heater 4b via the high-temperature outlet of the first-stage back heater 4a and releases excess heat inside it, then enters the high-temperature inlet of the $CO_2$ cooler 5 via the high-temperature outlet of the second-stage back heater 4b and releases excess heat inside it, then enters the inlet of the first-stage compressor 2a via the high-temperature outlet of the $CO_2$ cooler 5 and raises pressure under external work, then enters the low-temperature inlet of the second-stage back heater 4b via the outlet of the first-stage compressor 2a and recycles heat from the high-temperature side inside it, then enters the low-temperature inlet of the first-stage back heater 4a via the low-temperature outlet of the second-stage back heater 4b and recycles heat from the high-temperature side inside it, then enters the low-temperature inlet of the $CO_2$ heater 3a to complete the first-stage supercritical $CO_2$ Brayton circulation via the low-temperature outlet of the first-stage back heater 4a inside it; the heat source used in the desalination process comes from a low-grade heat source that cannot be utilized by the thermodynamic circulation, the demineralized water enters the low-temperature inlet of the $CO_2$ cooler 5 via the outlet of the water pump 11e under the pressure boost of the freshwater pump 11e and absorbs the cooled heat emitted by the power circulation inside it, then enters the high-temperature inlet of the seawater preheater 6b via the low-temperature outlet of the $CO_2$ cooler 5 and transmits heat to the seawater inside it, then enters the inlet of the freshwater pump 11e via the high-temperature outlet of the seawater preheater 6b to complete the circulation; the flue gas discharged from the boiler 7 enters the high-temperature inlet of the seawater heater 6a, and release heat to heat the seawater, then is discharged from the high-temperature outlet of the seawater heater 6a: the original low-temperature seawater enters the low-temperature inlet of the steam condenser 6e, and recycles the condensation heat of the water vapor inside it, then enters the inlet 35a of the low-temperature condenser 33 in the middle-stage flash evaporator 13 via the low-temperature outlet of the steam condenser 6e and recycles the condensation heat of the water vapor inside it, then enters the inlet 25a of the low-temperature condenser 23 in the first-stage flash evaporator 12 via the outlet 35b of the low-temperature condenser 33 in the middle-stage flash evaporator 13, and recycles the condensation heat of water vapor inside it, then enters the inlet of the first-stage seawater pump 11d via the outlet 25b of the low-temperature condenser 23 in the middle-stage flash evaporator 13, and raises pressure inside it, then enters (the excess seawater is discharged after split-flow via the $14^{th}$ 3-way valve 10p) the low-temperature inlet of the seawater preheater 6b via the outlet of the first-stage seawater pump 11d, and absorbs the cooled heat emitted by the power circulation inside it, then enters the low-temperature inlet of the seawater heater 6a via the low-temperature outlet of the seawater preheater 6b, and absorbs the remaining heat of the flue gas discharged from the boiler 7 inside it, then enters the inlet 25e of the first seawater tank 24 of the first-stage flash evaporator 12 via the low-temperature outlet of the seawater heater 6a and flashes inside it; the concentrated seawater enters the inlet of the second-stage seawater pump 11e via the bottom outlet 25f of the first seawater tank 24 of the first-stage flash evaporator 12 and raises pressure inside it, then enters the inlet 35e of the second seawater tank 34 of the middle-stage flash evaporator 13 via the outlet of the second-stage seawater pump 11e and flashes inside it; the concentrated seawater enters the inlet of the third-stage seawater pump 11f via the bottom outlet 35f of the second seawater tank 34 of the middle-stage flash evaporator 13 and raises pressure inside it, then enters the inlet 46a of the water distributor 43 of the final-stage flash evaporator 14 via the outlet of the third-stage seawater pump 11f, and the seawater further concentrated through the grilles 44 of the water distributor 43 flows convergently into the third seawater tank 45 of the final-stage flash evaporator 14, and enters the fourth-stage seawater pump 11g from its bottom to be discharged; wherein the flash steam in the first-stage flash evaporator 12 contacts the fresh water condensed by the low-temperature condenser 23 in the first-stage flash evaporator 12, which is collected by means of the condensate water pan 23 in the first-stage flash evaporator 12 and then enters the freshwater storing tank 15 via the outlet 25d of the condensate water pan 23, the uncondensed portion of the flash steam in the first-stage flash evaporator 12 enters the steam inlet of the middle-stage flash evaporator 13 via the stream outlet 25c of the first-stage flash evaporator 12, and mixes with the flash steam in middle-stage flash evaporator 13, then the steam contacts the low-temperature condenser 33 in the middle-stage flash evaporator 13 to condense the fresh water, which is collected by the condensate water pan 33 in the middle-stage flash evaporator 13, then enters the fresh water storing tank 15 from the outlet 35d of the condensate water pan 33, the uncondensed portion of the steam in the middle-stage flash evaporator 13 mixes with the flash steam in the final-stage flash evaporator 14 via the inlet of the $15^{th}$ 3-way valve 10q, then enters the high-temperature inlet of the steam condenser 6e from the outlet of the 15$^{th}$ 3-way valve 10q, and releases heat and condenses inside it, the condensed fresh water enters the fresh water storing tank 15 from the high-temperature outlet of the steam condenser 6c. In this operating mode, the output of the thermodynamic system can be adjusted within a reasonable range by means of the boiler 7, the heat storing tank 8 and the $CO_2$ circulation flow, meanwhile seawater flow appropriately increases to enhance freshwater production.

EXAMPLE 4

Figure 4:
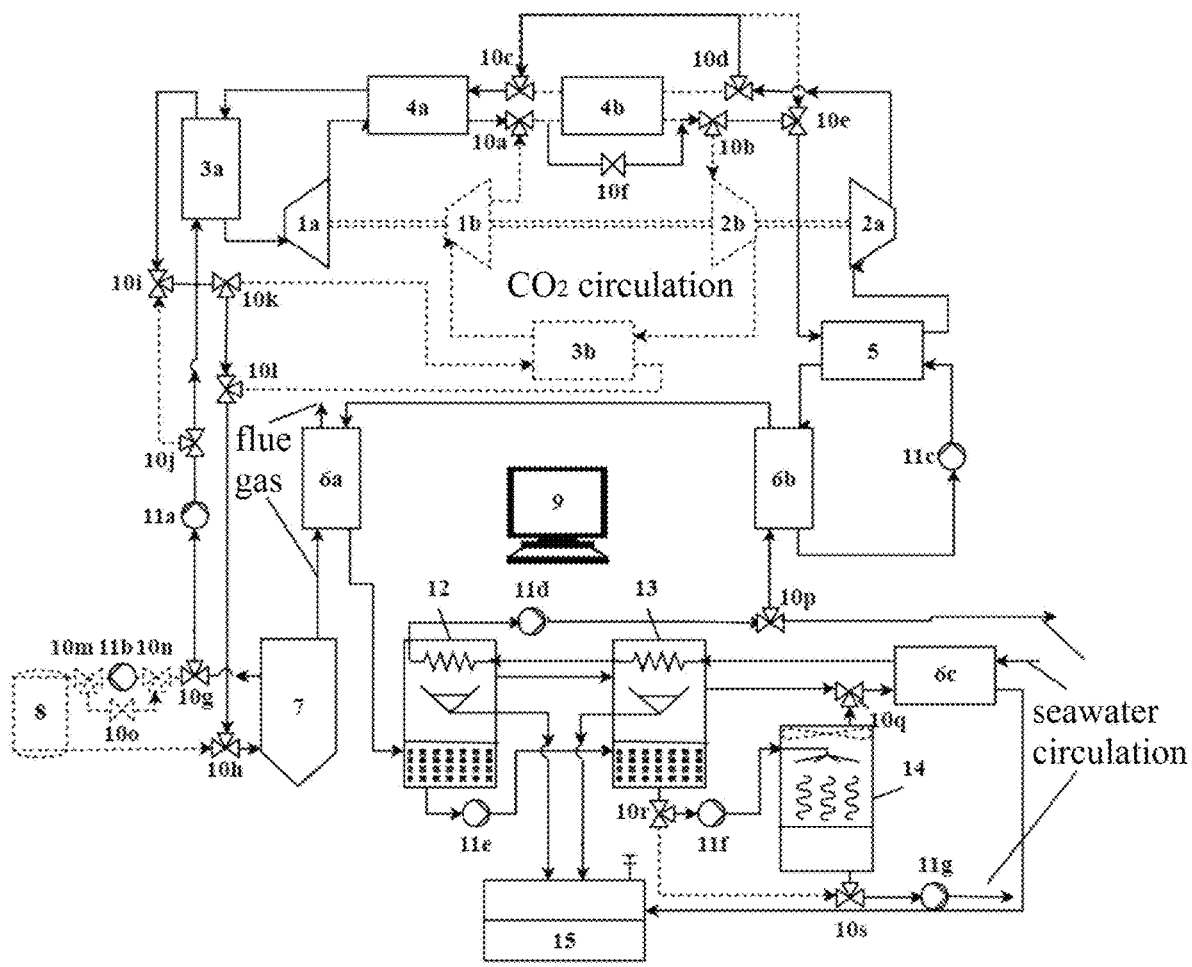
FIG. 4 is a schematic diagram of Operating Mode 3 of the electricity-water co-production system of the examples in the present invention.

As shown in FIG. 4, when the power grid requires the power plant to reduce output, the power plant selects Operating Mode 3. At this time, the power grid requires the power plant to further reduce output or the power plant actively enters the median output mode at the median electricity price, while the seawater desalination process enters the median power consumption mode. As aforementioned, the controller 9 adjusts the actuators such as various valves and pumps and the existing pipelines to achieve the following process steps, the heat source outlet of the boiler 7 is connected to the high-temperature inlet of the $CO_2$ heater 3a, the high-temperature outlet of the $CO_2$ heater 3a is connected to the heat source inlet of the boiler 7 (the interaction of the 11$^{th}$ 3-way valve and the 12$^{th}$ 3-way valve arising from the adjustment of the valve group directly bypasses the high-temperature side of the $CO_2$ preheater 3b) to complete providing heat for the entire power circulation, at this time, the $CO_2$ heater 3a provides heat for the first-stage supercritical $CO_2$ Brayton circulation, and the second-stage supercritical $CO_2$ Brayton circulation is bypassed; among them, the circulating medium $CO_2$ of the first-stage supercritical $CO_2$ Brayton circulation, passes through the low-temperature inlet of the $CO_2$ heater 3a and is heated inside it, then enters the inlet of the first-stage expander 1a via the low-temperature outlet of the $CO_2$ heater 3a, expands inside it and outputs work, then enters the high-temperature inlet of the first-stage back heater 4a via the outlet of the first-stage expander 1a and releases excess heat inside it, then enters the high-temperature inlet of the $CO_2$ cooler 5 via the high-temperature outlet of the first-stage back heater 4a and releases excess heat inside it (the interaction of the 1$^{st}$ 3-way valve 10a, the 1$^{st}$ bypass valve 10f and the 2$^{nd}$ 3-way valve 10b arising from the adjustment of the valve group directly bypasses the high-temperature side of the second-stage back heater 4b), then enters the inlet of the first-stage compressor 2a via the high-temperature outlet of the $CO_2$ cooler 5, and raises pressure under external work, then enters the low-temperature inlet of the first-stage back heater 4a via the outlet of the first-stage compressor 2a (the interaction of the 3$^{rd}$ 3-way valve 10c and the 4$^{th}$ 3-way valve 10d arising from the adjustment of the valve group directly bypasses the low-temperature side of the second-stage back heater 4b) and recycles the heat from the high-temperature side inside it, then enters the low-temperature inlet of the $CO_2$ heater 3a to complete the first-stage supercritical $CO_2$ Brayton circulation via the low-temperature outlet of the first-stage back heater 4a; the heat source used in the desalination process comes from a low-grade heat source that cannot be utilized by the thermodynamic circulation, the demineralized water enters the low-temperature inlet of the $CO_2$ cooler 5 via the outlet of the water pump 11c under the pressure boost of the freshwater pump 11c and absorbs the cooled heat emitted by the power circulation inside it, then enters the high-temperature inlet of the seawater preheater 6b via the low-temperature outlet of the $CO_2$ cooler 5 and transmits heat to the seawater inside it, then enters the inlet of the freshwater pump 11c via the high-temperature outlet of the seawater preheater 6b to complete the circulation; the flue gas discharged from the boiler 7 enters the high-temperature inlet of the seawater heater 6a, and release heat to heat of the seawater, then is discharged from the high-temperature outlet of the seawater heater 6a; the original low-temperature seawater enters the low-temperature inlet of the steam condenser 6c, and recycles the condensation heat of the water vapor inside it, then enters the inlet 35a of the low-temperature condenser 33 in the middle-stage flash evaporator 13 via the low-temperature outlet of the steam condenser 6c and recycles the condensation heat of the water vapor inside it, then enters the inlet 25a of the low-temperature condenser 23 in the first-stage flash evaporator 12 via the outlet 35b of the low-temperature condenser 33 in the middle-stage flash evaporator 13, and recycles the condensation heat of water vapor inside it, then enters the inlet of the first-stage seawater pump 11d via the outlet 25b of the low-temperature condenser 23 in the middle-stage flash evaporator 13, and raises pressure inside it, then enters (the excess seawater is discharged after split-flow via the 14$^{th}$ 3-way valve 10p) the low-temperature inlet of the seawater preheater 6b via the outlet of the first-stage seawater pump 11d, and absorbs the cooled heat emitted by the power circulation inside it, then enters the low-temperature inlet of the seawater heater 6a via the low-temperature outlet of the seawater preheater 6b, and absorbs the remaining heat of the flue gas discharged from the boiler 7 inside it, then enters the inlet 25e of the first seawater tank 24 of the first-stage flash evaporator 12 via the low-temperature outlet of the seawater heater 6a and flashes inside it; the concentrated seawater enters the inlet of the second-stage seawater pump 11e via the bottom outlet 25f of the first seawater tank 24 of the first-stage flash evaporator 12 and raises pressure inside it, then enters the inlet 35e of the second seawater tank 34 of the middle-stage flash evaporator 13 via the outlet of the second-stage seawater pump 11e and flashes inside it; the concentrated seawater enters the inlet of the third-stage seawater pump 11f via the bottom outlet 35f of the second seawater tank 34 of the middle-stage flash evaporator 13 and raises pressure inside it, then enters the inlet 46a of the water distributor 43 of the final-stage flash evaporator 14 via the outlet of the third-stage seawater pump 11f, and the seawater further concentrated through the grilles 44 of the water distributor 43 flows convergently into the third seawater tank 45 of the final-stage flash evaporator 14, and enters the fourth-stage seawater pump 11g from its bottom to be discharged; wherein the flash steam in the first-stage flash evaporator 12 contacts the fresh water condensed by the low-temperature condenser 23 in the first-stage flash evaporator 12, which is collected by means of the condensate water pan 23 in the first-stage flash evaporator 12 and then enters the freshwater storing tank 15 via the outlet 25d of the condensate water pan 23, the uncondensed portion of the flash steam in the first-stage flash evaporator 12 enters the steam inlet of the middle-stage flash evaporator 13 via the stream outlet 25c of the first-stage flash evaporator 12, and mixes with the flash steam in middle-stage flash evaporator 13, then the steam contacts the low-temperature condenser 33 in the middle-stage flash evaporator 13 to condense the fresh water, which is collected by the condensate water pan 33 in the middle-stage flash evaporator 13, then enters the fresh water storing tank 15 from the outlet 35d of the condensate water pan 33, the uncondensed portion of the steam in the middle-stage flash evaporator 13 mixes with the flash steam in the final-stage flash evaporator 14 via the inlet of the 15$^{th}$ 3-way valve 10$q$, then enters the high-temperature inlet of the steam condenser 6$c$ from the outlet of the 15$^{th}$ 3-way valve 10$q$, and releases heat and condenses inside it, the condensed fresh water enters the fresh water storing tank 15 from the high-temperature outlet of the steam condenser 6$c$. In this operating mode, the output of the thermodynamic system can be adjusted within a reasonable range by means of the boiler 7, the heat storing tank 8 and the $CO_2$ circulation flow, meanwhile seawater flow appropriately increases to enhance freshwater production

EXAMPLE 5

Figure 5:
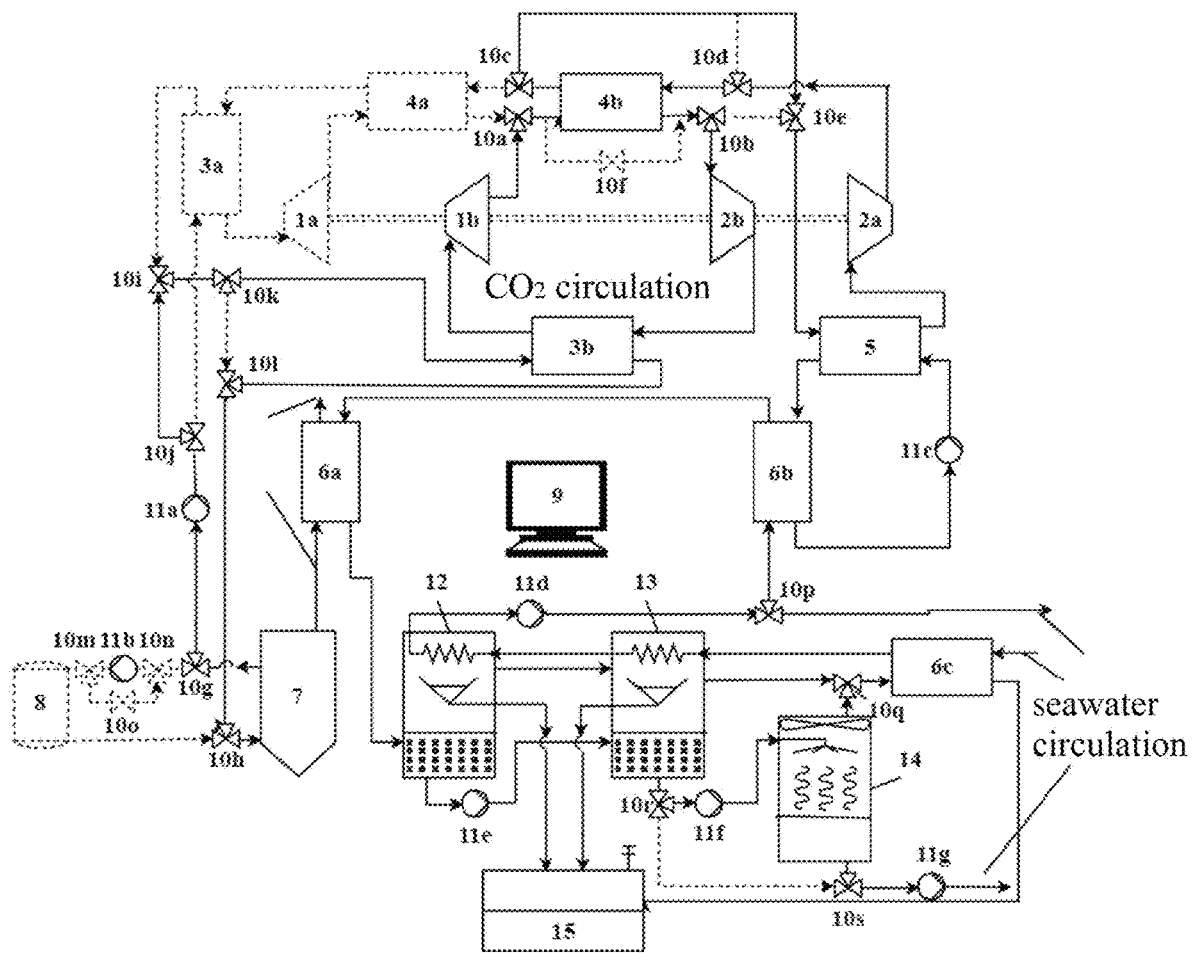
FIG. 5 is a schematic diagram of Operating Mode 4 of the electricity-water co-production system of the examples in the present invention.

As shown in FIG. 5, when the power grid requires the power plant to operate in the lowest load state, the power plant selects Operating Mode 4.

At this time, the power grid requires the power plant to output in a low load state or the power plant actively enters the lowest output mode at the low electricity price, while the seawater desalination process enters the lowest power consumption mode. As aforementioned, the controller 9 adjusts the actuators such as various valves and pumps and the existing pipelines to achieve the following process steps, the heat source outlet of the boiler 7 is connected to the high-temperature inlet of the $CO_2$ preheater 3$b$ (the interaction of the 8$^{th}$ 3-way valve 10$i$ and the 9$^{th}$ 3-way valve 10$j$ arising from the adjustment of the valve group directly bypasses the high-temperature side of the $CO_2$ heater 3$a$), and the high-temperature outlet of the $CO_2$ preheater 3$b$ is connected to the heat source inlet of the boiler 7 to complete providing heat for the entire power circulation, at this time, the $CO_2$ heater 3$a$ provides heat for the second-stage supercritical $CO_2$ Brayton circulation, and the first-stage supercritical $CO_2$ Brayton circulation is bypassed; among them, the circulating medium $CO_2$ of the second-stage supercritical $CO_2$ Brayton circulation, passes through the low-temperature inlet of the $CO_2$ preheater 3$b$ and is heated inside it, then enters the inlet of the second-stage expander 1$b$ via the low-temperature outlet of the $CO_2$ preheater 3$b$, expands inside it and outputs work, then enters the high-temperature inlet of the second-stage back heater 4$b$ via the outlet of the second-stage expander 1$b$ and releases excess heat inside it, then enters the inlet of the second-stage compressor 2$b$ via the high-temperature outlet of the second-stage back heater 4$b$, and raises pressure under external work to complete the second-stage supercritical $CO_2$ Brayton circulation, as well as build a $CO_2$ cooling circulation in which the $CO_2$ fluid enters the low-temperature inlet of the second-stage back heater 4$b$ and absorbs the heat from the high-temperature side inside it, then the $CO_2$ fluid enters the high-temperature inlet of the $CO_2$ cooler 5 via the low-temperature outlet of the second-stage back heater 4$b$ and releases excess heat inside it, then enters the inlet of the first-stage compressor 2$a$ via the high-temperature outlet of the $CO_2$ cooler 5 and raises pressure under external work, then enters the low-temperature inlet of the second-stage back heater 4$b$ to complete the $CO_2$ cooling circulation via the outlet of the first-stage compressor 2$a$ (the interaction of the 1$^{st}$ 3-way valve 10$a$, the 2$^{nd}$ 3-way valve 10$b$, the 3$^{rd}$ 3-way valve 10$c$, the 4$^{th}$ 3-way valve 10$d$ and the 5$^{th}$ 3-way valve 10$e$ arising from the adjustment of the valve group directly bypasses the $CO_2$ heater 3$a$, the first-stage back heater 4$a$ and the first-stage expander 1$a$ and rebuilds the power plant into the second-stage supercritical $CO_2$ Brayton circulation overlapping the $CO_2$ cooling circulation); the heat source used in the desalination process comes from a low-grade heat source that cannot be utilized by the thermodynamic circulation, the demineralized water enters the low-temperature inlet of the $CO_2$ cooler 5 via the outlet of the water pump 11$c$ under the pressure boost of the freshwater pump 11$c$ and absorbs the cooled heat emitted by the power circulation inside it, then enters the high-temperature inlet of the seawater preheater 6$b$ via the low-temperature outlet of the $CO_2$ cooler 5 and transmits heat to the seawater inside it, then enters the inlet of the freshwater pump 11$c$ via the high-temperature outlet of the seawater preheater 6$b$ to complete the circulation; the flue gas discharged from the boiler 7 enters the high-temperature inlet of the seawater heater 6$a$, and release heat to heat the seawater, then is discharged from the high-temperature outlet of the seawater heater 6$a$; the original low-temperature seawater enters the low-temperature inlet of the steam condenser 6$c$, and recycles the condensation heat of the water vapor inside it, then enters the inlet 35$a$ of the low-temperature condenser 33 in the middle-stage flash evaporator 13 via the low-temperature outlet of the steam condenser 6$c$ and recycles the condensation heat of the water vapor inside it, then enters the inlet 25$a$ of the low-temperature condenser 23 in the first-stage flash evaporator 12 via the outlet 35$b$ of the low-temperature condenser 33 in the middle-stage flash evaporator 13, and recycles the condensation heat of water vapor inside it, then enters the inlet of the first-stage seawater pump 11$d$ via the outlet 25$b$ of the low-temperature condenser 23 in the middle-stage flash evaporator 13, and raises pressure inside it, then enters (the excess seawater is discharged after split-flow via the 14$^{th}$ 3-way valve 10$p$) the low-temperature inlet of the seawater preheater 6$b$ via the outlet of the first-stage seawater pump 11$d$, and absorbs the cooled heat emitted by the power circulation inside it, then enters the low-temperature inlet of the seawater heater 6$a$ via the low-temperature outlet of the seawater preheater 6$b$, and absorbs the remaining heat of the flue gas discharged from the boiler 7 inside it, then enters the inlet 25$e$ of the first seawater tank 24 of the first-stage flash evaporator 12 via the low-temperature outlet of the seawater heater 6$a$ and flashes inside it; the concentrated seawater enters the inlet of the second-stage seawater pump 11$e$ via the bottom outlet 25$f$ of the first seawater tank 24 of the first-stage flash evaporator 12 and raises pressure inside it, then enters the inlet 35$e$ of the second seawater tank 34 of the middle-stage flash evaporator 13 via the outlet of the second-stage seawater pump 11$e$ and flashes inside it; the concentrated seawater enters the inlet of the third-stage seawater pump 11$f$ via the bottom outlet 35$f$ of the second seawater tank 34 of the middle-stage flash evaporator 13 and raises pressure inside it, then enters the inlet 46$a$ of the water distributor 43 of the final-stage flash evaporator 14 via the outlet of the third-stage seawater pump 11$f$, and the seawater further concentrated through the grilles 44 of the water distributor 43 flows convergently into the third seawater tank 45 of the final-stage flash evaporator 14, and enters the fourth-stage seawater pump 11$g$ from its bottom to be discharged; wherein the flash steam in the first-stage flash evaporator 12 contacts the fresh water condensed by the low-temperature condenser 23 in the first-stage flash evaporator 12, which is collected by means of the condensate water pan 23 in the first-stage flash evaporator 12 and then enters the freshwater storing tank 15 via the outlet 25$d$ of the condensate water pan 23, the uncondensed portion of the flash steam in the first-stage flash evaporator 12 enters the steam inlet of the middle-stage flash evaporator 13 via the stream outlet 25$c$ of the first-stage flash evaporator 12, and mixes with the flash steam in middle-stage flash evaporator 13, then the steam contacts the low-temperature condenser 33 in the middle-stage flash evaporator 13 to condense the fresh water, which is collected by the condensate water pan 33 in the middle-stage flash evaporator 13, then enters the fresh water storing tank 15 from the outlet 35$d$ of the condensate water pan 33, the uncondensed portion of the steam in the middle-stage flash evaporator 13 mixes with the flash steam in the final-stage flash evaporator 14 via the inlet of the $15^{th}$ 3-way valve 10$q$, then enters the high-temperature inlet of the steam condenser 6$c$ from the outlet of the $15^{th}$ 3-way valve 10$q$, and releases heat and condenses inside it, the condensed fresh water enters the fresh water storing tank 15 from the high-temperature outlet of the steam condenser 6$c$. In this operating mode, the output of the thermodynamic system can be adjusted within a reasonable range by means of the boiler 7, the heat storing tank 8 and the $CO_2$ circulation flow, meanwhile seawater flow appropriately increases to enhance freshwater production, at this time, the fan 42 in the final-stage flash evaporator 14 is normally turned on.

Figure 6:
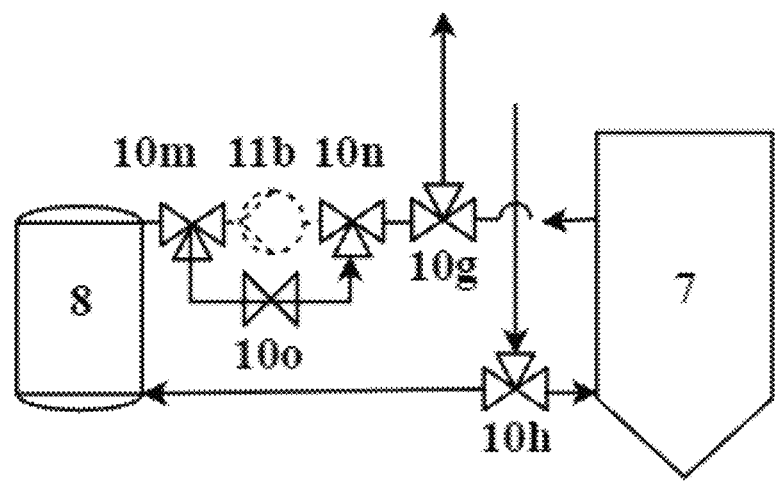
FIG. 6 is a schematic diagram of the first state of the heat source system in the combination with the heat storage according to the present invention.
Figure 7:
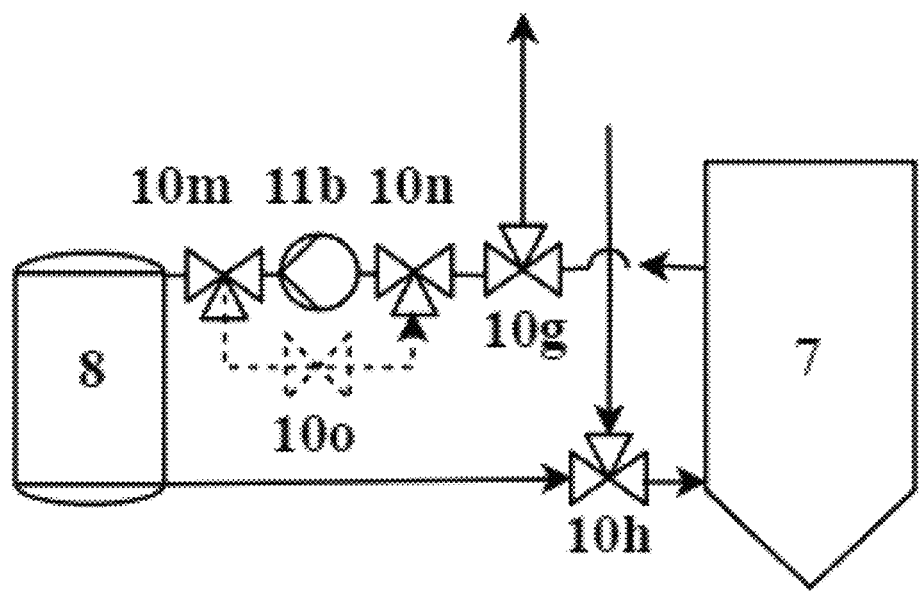
FIG. 7 is a schematic diagram of the second state of the heat source system in the combination with the heat storage according to the present invention.

As shown in FIGS. 6-7, the heat storing tank 8 operates in three operating modes, that is, the heat storing mode, the heat extracting mode and the closing mode. In the storing mode, the intermediate working medium is heated in boiler 7 and then enters the $6^{th}$ 3-way valve 10$g$ from the inlet of the boiler 7 and splits, then the main portion is used to heat the thermodynamic circulation, and the excess part enters the inlet of the intermediate working medium pump 11$b$ and raises pressure inside it, then enters the inlet of the heat storing tank 8 via the outlet of the intermediate working medium pump 11$b$ and releases heat inside it, then enters the $7^{th}$ 3-way valve 10$h$ to mix with the fluid passing through heating and the thermodynamic circulation via the outlet of the heat storing tank, then return to the boiler 7. In the heat extracting mode, after passing through heating and the thermodynamic circulation, the intermediate working medium splits into one stream at the $7^{th}$ 3-way valve 10$h$, which flows into the boiler 7 and absorbs heat in it, then enters the $6^{th}$ 3-way valve 10$g$ from the outlet of the boiler 7, and the other stream, which flows into the inlet of the heat storing tank 8 and absorbs heat inside it, then enters the $6^{th}$ 3-way valve 10$g$ from the outlet of the heat storing tank 8 (the interaction of the $12^{th}$ 3-way valve 10$m$, the $13^{th}$ 3-way valve 10$n$ and the $2^{nd}$ bypass valve 10$o$ arising from the adjustment of the valve group directly bypasses the intermediate working medium pump 11$b$), the two streams flow convergently at the $6^{th}$ 3-way valve 10$g$, then heat the thermodynamic circulation. In the closing mode, the interaction of the $6^{th}$ 3-way valve 10$g$ and the $7^{th}$ 3-way valve 10$n$ arising from the adjustment of the valve group directly bypasses the intermediate working medium pump 11$b$ and the heat storing tank 8. When the highly-flexible electricity-water co-production system based on supercritical carbon dioxide power circulation in combination with seawater desalination operates stably in Operating Mode 1, Operating Mode 2, Operating Mode 3 and Operating Mode 4, the heat storing tank 8 is the closing mode; when the power plant switches from a high power output mode to a low power output mode (for example, switches from Operating Mode 1 to Operating Mode 2), or when in a given operating mode, the power plant adjusts the flow volume to reduce power output, but the boiler cannot quickly reduce heat output, the heat storing tank 8 is the heat storing mode; when the power plant switches from a low power output mode to a high power output mode, or when in a given operating mode, the power plant adjusts the flow volume to raise power output, but the boiler cannot quickly raise heat output, the heat storing tank 8 is the heat storing mode.

Figure 8:
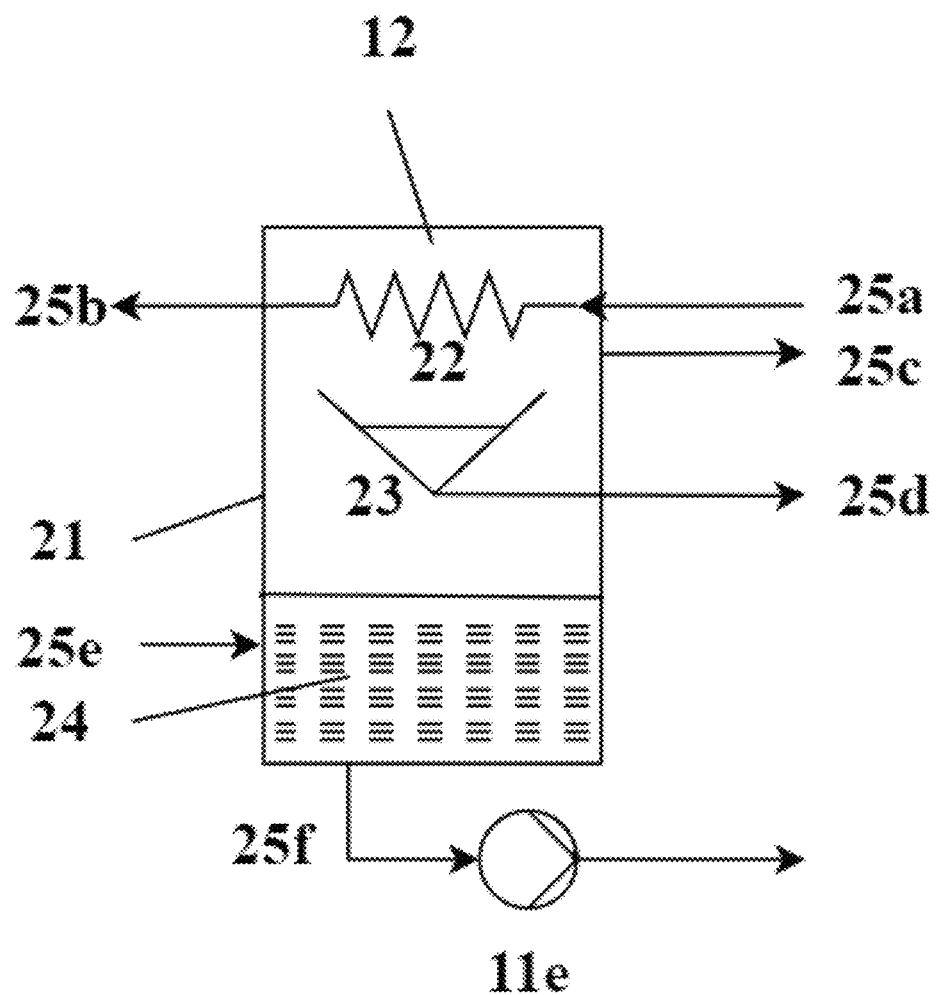
FIG. 8 is a structural schematic diagram of the first-stage flash evaporator of the present invention.
Figure 9:
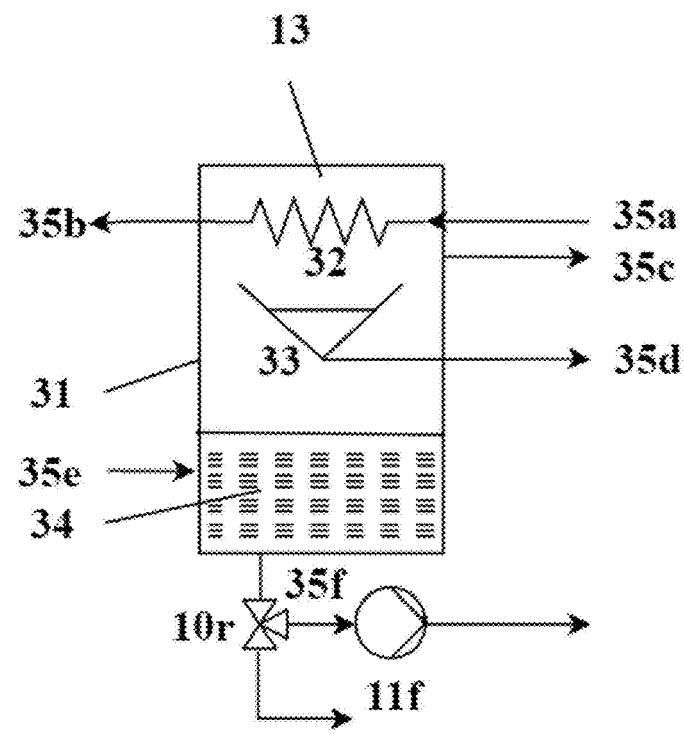
FIG. 9 is a structural schematic diagram of the middle-stage flash evaporator of the present invention.

As shown in FIGS. 8-9, the first-stage flash evaporator 12 is composed of five parts: the first housing 21, the first low-temperature condenser 22, the first condensate water pan 23, the first seawater tank 24, and the second-stage seawater pump 11$e$. The first-stage flash evaporator 12 includes 6 interfaces, that is, the first low-temperature seawater inlet 25$a$, the first low-temperature seawater outlet 25$b$, the first water vapor outlet 25$c$, the first fresh water outlet 25$d$, the first high-temperature seawater inlet 25$e$ and the first high-temperature seawater outlet 25$f$, among them, the pebbles piled in the first seawater tank 24 enhance gas velocity, and the first fresh water outlet 25$d$ led from the bottom of the first condensate water pan 23 is used to discharge condensate water.

Furthermore, the water vapor flashed from the first-stage flash evaporator 12 contacts the first low-temperature condenser 22 in the first-stage flash evaporator 12 to condense into fresh water, which is collected by the first condensate water pan 23 in the first-stage flash evaporator 12, and finally flows convergently in the fresh water storing tank 15; the rest steam flows into the middle-stage flash evaporator 13 and mixes with the water vapor flashed from the middle-stage flash evaporator 13, then contacts the low-temperature condenser 32 in the middle-stage flash evaporator 13 to condense into fresh water, which is collected by the second condensate water pan 33 in the middle-stage flash evaporator 13, and finally flows convergently in the fresh water storing tank 15; the remaining steam mixes with the water vapor flashed from the dilated final-stage flash evaporator 14 via the $15^{th}$ 3-way valve 10$q$, then enters the high-temperature side of the steam condenser 6$e$ to release heat and condense into fresh water, which finally flows into the fresh water storing tank 15.

Furthermore, the middle-stage flash evaporator 13 is composed of five parts: the second housing 31, the second low-temperature condenser 32, the second condensate water pan 33, the second seawater tank 34, and the third-stage seawater pump 11$f$. The middle-stage flash evaporator 13 includes 6 interfaces, that is, the second low-temperature seawater inlet 35$a$, the second low-temperature seawater outlet 35$b$, the second water vapor outlet 35$c$, the second fresh water outlet 35$d$, the second high-temperature seawater inlet 35$e$ and the second high-temperature seawater outlet 35$f$, among them, the pebbles piled in the second seawater tank 34 enhance gas velocity, and the second fresh water outlet 35$d$ led from the bottom of the second condensate water pan 33 is used to discharge condensate water. The middle-stage flash evaporator 13 is different from the first-stage flash evaporator 12 in the respect of its increase or decrease in number according to the desalination process, and the second seawater tank 34 in the middle-stage flash evaporator 13 can be equipped with a flue gas remaining heat recycling device according to the desalination process, which utilizes the flue gas discharged from the high-temperature side of the seawater heater 6$a$.

Figure 10:
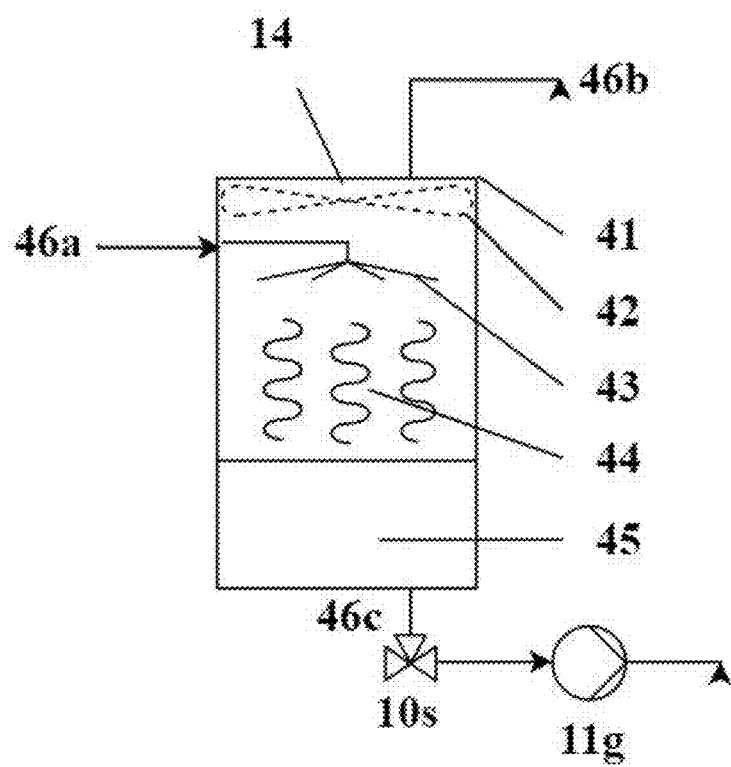
FIG. 10 is a structural diagram of the final-stage flash evaporator of the present invention.
Figure 11:
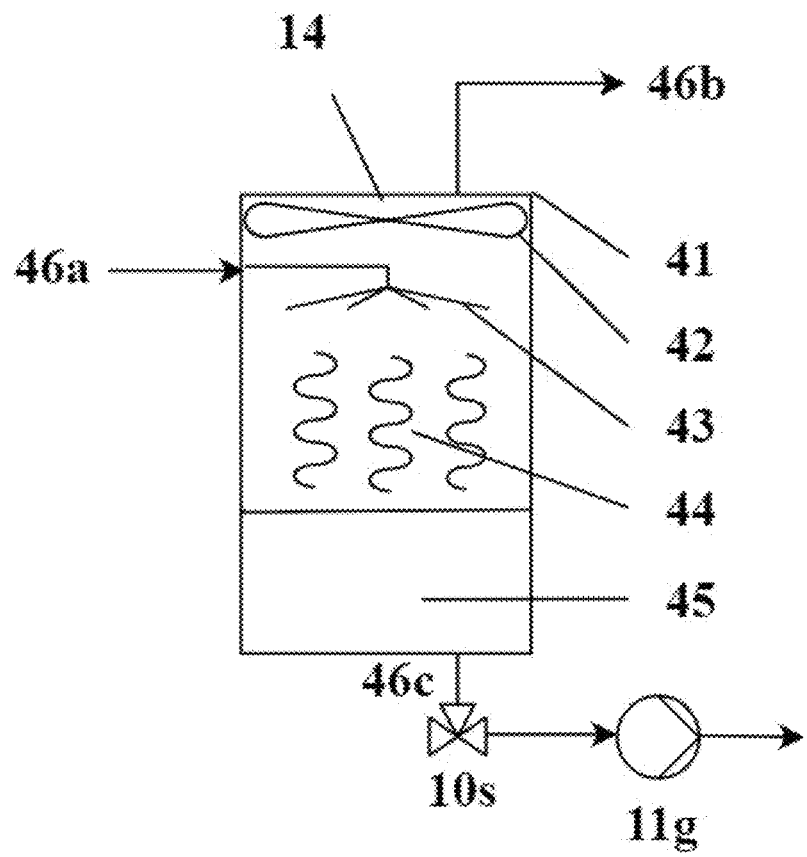
FIG. 11 is a structural perspective diagram of the final-stage flash evaporator of the present invention.
Figure 12:
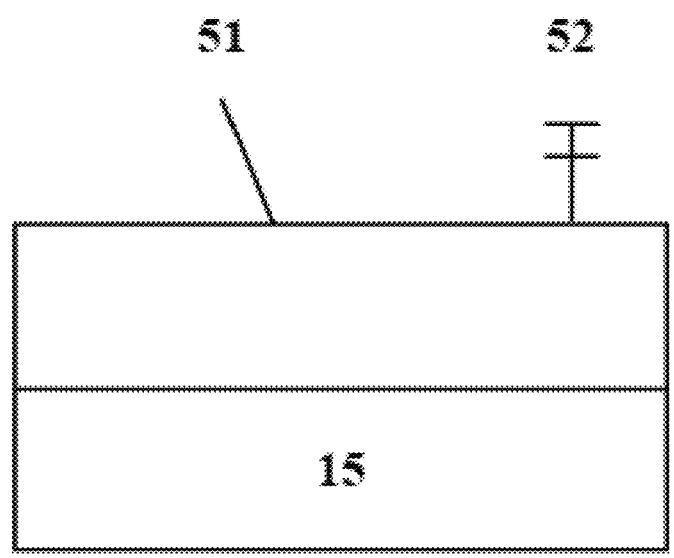
FIG. 12 is a schematic diagram of the fresh water storing tank of the present invention.

As shown in FIGS. 10-11, the final-stage flash evaporator 14 is composed of six parts: the third housing 41, the fan 42, the water distributor 43, the grilles 44, the third seawater tank 45, and the third-stage seawater pump 11$f$, the fan 42 is used to enhance disturbance and raise the evaporation rate of seawater on the surface of the grilles 44.

As shown in FIG. 2, the fresh water storing tank 15 is provided with the sealed chamber 51, the upper part of which is equipped with the exhaust valve 52 to provide negative pressure for the fresh water side of the desalination process.

The middle-stage flash evaporator 13 can increase or decrease in number according to the evaporation volume required by the process, and the 15$^{th}$ 3-way valve 10$q$, the 16$^{th}$ 3-way valve 10$r$ and the 17$^{th}$ three-way valve 10$s$ are used to bypass the final-stage flash evaporator 14.

What is claimed is:

1. A flexible power plant based on supercritical carbon dioxide power circulation in combination with seawater desalination, comprising a heat source circulation system, a thermodynamic circulation system, a desalination system and a control system;

wherein said heat source circulation system is connected to said thermodynamic circulation system and said seawater desalination system, and provides heat source required for their operations, respectively;

said control system is simultaneously connected to respective actuators of said heat source circulation system, said thermodynamic circulation system and said seawater desalination system, and controls their operations, correspondingly;

wherein said heat source circulation system includes a boiler (7), a heat storing tank (8), a $CO_2$ heater (3$a$), a $CO_2$ preheater (3$b$), a seawater heater (6$a$), a 2$^{nd}$ bypass valve (10$o$), a 6$^{th}$ 3-way valve (10$g$), a 7$^{th}$ 3-way valve (10$h$), a 8$^{th}$ 3-way valve (10$i$), a 9$^{th}$ 3-way valve (10$j$), a 10$^{th}$ 3-way valve (10$k$), a 11$^{th}$ 3-way valve (10$l$), a 12$^{th}$ 3-way valve (10$m$), a 13$^{th}$ 3-way valve (10$n$), a first intermediate working medium pump (11$a$), a second intermediate working medium pump (11$b$) and accessory pipelines;

the boiler (7) is an original heat source of said heat source circulation system, the boiler (7) is connected in series with the $CO_2$ heater (3$a$) and the $CO_2$ preheater (3$b$), and provides heat for said thermodynamic circulation system; the boiler (7) is connected to the seawater heater (6$a$) and provides heat for said desalination system;

the heat storing tank (8) is connected in parallel on both sides of the in-series heat exchanger group composed of the $CO_2$ heater (3$a$) and the $CO_2$ preheater (3$b$) to adjust a mismatch between thermal inertia and the load of the $CO_2$ heater (3$a$) and the $CO_2$ preheater (3$b$) in the heat exchange process of the boiler;

the first intermediate working medium pump (11$a$) and the second intermediate working medium pump (11$b$) are connected to said thermodynamic circulation system and the heat storing tank (8), respectively, and are used to adjust the flow allocation of said thermodynamic circulation system and the heat storing tank (8), respectively; the 12$^{th}$ 3-way valve (10$m$), the 13$^{th}$ 3-way valve (10$n$) and the 2$^{nd}$ bypass valve (10$o$) are connected in parallel with the second intermediate working medium pump (11$b$), and achieve absorbing and releasing from/into the heat storing tank (8) and adjusting flow volume;

the 8$^{th}$ 3-way valve (10$i$) and the 9$^{th}$ 3-way valve (10$j$) are used to bypass the high-temperature side of the $CO_2$ heater (3$a$) and the 10$^{th}$ 3-way valve (10$k$) and the 11$^{th}$ three-way valve (10$l$) are used to bypass the high-temperature side of the $CO_2$ preheater (3$b$), so as to achieve flexibly controlling thermodynamic circulation in a wide range.

2. The flexible power plant based on supercritical carbon dioxide power circulation in combination with seawater desalination according to claim 1, wherein the heat storing material of the heat storing tank (8) is selected from a molten salt or liquid metal, which stores part of heat in the heat storing tank (8) based on the requirements of the power system, when the power system declines and the heat of the boiler cannot be quickly adjusted, and which extracts the heat stored in the heat storing tank (8) to supplement the power circulation with heat, when the power system rises and the heat of the boiler cannot be quickly adjusted;

the $CO_2$ heater (3$a$), the $CO_2$ preheater (3$b$) and the seawater heater (6$a$) are directly installed inside the boiler (7), replacing an intermediate medium to directly heat $CO_2$ or seawater.

3. The flexible power plant based on supercritical carbon dioxide power circulation in combination with seawater desalination according to claim 1, wherein said thermodynamic circulation system includes a $CO_2$ heater (3$a$), a $CO_2$ preheater (3$b$), a first-stage expander (1$a$), a second-stage expander (1$b$), a first-stage compressor (2$a$), a second-stage compressor (2$b$), a first-stage back heater (4$a$), a second-stage back heater (4$b$), a $CO_2$ cooler 5, a 1$^{st}$ bypass valve (10$f$), a 1$^{st}$ 3-way valve (10$a$), 2$^{nd}$ 3-way valve (10$b$), 3$^{rd}$ 3-way valve (10$c$), 4$^{th}$ 3-way valve (10$d$), 5$^{th}$ 3-way valve (10$e$) and accessory pipelines;

said thermodynamic circulation system uses $CO_2$ as a working medium, and has two built-in supercritical $CO_2$ Brayton circulations, including a first-stage supercritical $CO_2$ Brayton circulation and a second-stage supercritical $CO_2$ Brayton circulation; the $CO_2$ heater (3$a$) provides heat for the first-stage supercritical $CO_2$ Brayton circulation, and then the $CO_2$ preheater (3$b$) provides heat for the second-stage supercritical $CO_2$ Brayton circulation through, enabling the first-stage supercritical $CO_2$ Brayton circulation and the second-stage supercritical $CO_2$ Brayton circulation to indirectly combine with each other and energy to get utilized stage by stage.

4. The flexible power plant based on supercritical carbon dioxide power circulation in combination with seawater desalination according to claim 3, wherein the circulating working medium of the first-stage supercritical $CO_2$ Brayton circulation is supercritical $CO_2$, and the $CO_2$ working medium successively flows via the first-stage compressor (2$a$), the low-temperature side of the second-stage back heater (4$b$), the low-temperature side of the first-stage back heater (4$a$), the low-temperature side of the $CO_2$ heater (3$a$), the first-stage expander (1$a$), the high-temperature side of the first-stage back heater (4$a$), the 1$^{st}$ 3-way valve (10$a$), the high-temperature side of the second-stage back heater (4$b$), the 2$^{nd}$ 3-way valve (10$b$), the high-temperature side of the $CO_2$ cooler (5) and the first-stage compressor (2$a$), so as to complete the circulation, the $CO_2$ fluid in correspondence to the above processes successively passes through several processes of raising pressure, absorbing heat, absorbing heat, absorbing heat, expansion, releasing heat, flow converging, releasing heat, flow splitting, releasing heat and raising pressure, so as to achieve the overall process of absorbing heat and doing work;

the circulating working medium of the second-stage supercritical $CO_2$ Brayton circulation is supercritical $CO_2$, and the $CO_2$ working medium successively flows via the second-stage compressor (2$b$), the low-temperature side of the $CO_2$ back heater (3$b$), the second-stage expander (1$b$), the 1$^{st}$ 3-way valve (10$a$), the high-temperature side of the second-stage back heater (4$b$), the 2$^{nd}$ 3-way valve (10$b$) and the second-stage compressor (2$b$), so as to complete the circulation, the $CO_2$ fluid in correspondence to the above processes successively passes through several processes of raising pressure, absorbing heat, expansion, flow converging, releasing heat, flow splitting and raising pressure, so as to achieve the overall process of absorbing heat and doing work;

the first-stage and second-stage supercritical $CO_2$ Brayton circulations realize their direct combination by means of the $1^{st}$ 3-way valve (10*a*), the $2^{nd}$ 3-way valve (10*b*) and the second-stage back heater (4*b*), adjusts the split-flow ratio of the two circulations by means of the $1^{st}$ 3-way valve (10*a*) and the $2^{nd}$ 3-way valve (10*b*) to coordinate the operation of said thermodynamic circulation system;

the $1^{st}$ 3-way valve (10*a*), the $2^{nd}$ 3-way valve (10*b*) and the $1^{st}$ bypass valve (10*f*) are used to bypass the second-stage supercritical $CO_2$ Brayton circulation, so that the first-stage supercritical $CO_2$ Brayton circulation operates independently; the $3^{rd}$ 3-way valve (10*c*), the $4^{th}$ 3-way valve (10*d*), and the $5^{th}$ 3-way valve (10*e*) are used to bypass the first-stage supercritical $CO_2$ Brayton circulation, so that the second-stage supercritical $CO_2$ Brayton circulation operates independently;

a transmission and a clutch are used to connect the first-stage expander (1*a*), the second-stage expander (1*b*), the first-stage compressor (2*a*) and the second-stage compressor (2*b*) to meet adjustment conditions; a heat exchanger with a printed circuit board is used in the $CO_2$ heater (3*a*), the $CO_2$ preheater (3*b*), the first-stage back heater (4*a*), the second-stage back heater (4*b*), and the $CO_2$ cooler (5).

5. The flexible power plant based on supercritical carbon dioxide power circulation in combination with seawater desalination according to claim 4, wherein said desalination system includes a $CO_2$ cooler (5), a seawater heater (6*a*), a seawater preheater (6*b*), a steam condenser (6*c*), a first-stage flash evaporator (12), a middle-stage flash evaporator (13), a final-stage flash evaporator (14), a fresh water storing tank (15), a $14^{th}$ 3-way valve (10*p*), a $15^{th}$ 3-way valve (10*q*), a $16^{th}$ 3-way valve (10*r*), a $17^{th}$ 3-way valve (10*s*), a fresh water pump (11*c*), a first-stage seawater pump (11*d*), a second-stage seawater pump (11*e*), a third-stage seawater pump (11*f*), a fourth-stage seawater pump (11*g*) and accessory pipelines;

the seawater heater (6*a*), the seawater preheater (6*b*), and the steam condenser (6*c*) use a shell-and-tube heat exchanger with high corrosion and blockage resistance, low requirements for pressure, and good economy, and the heat exchanger pipe group in the heat exchanger is made of copper pipes;

the heat for heating seawater comes from three sources, including the condensation heat carried by the flashed seawater recycled via the steam condenser (6*c*), the middle-stage flash evaporator (13) and the first-stage flash evaporator (12), the cooled heat recycled from the terminal of the thermodynamic circulation via seawater preheater (6*b*), and the waste heat of the recycled flue gas in the heat source circulation via the seawater heater (6*a*), among them the demineralized water successively flows through the fresh water pump (11*c*), the low-temperature side of the $CO_2$ cooler (5), the high-temperature side of the seawater preheater (6*b*), and the fresh water pump (11*c*), correspondingly finishing the circulation process of raising pressure, absorbing heat, releasing heat and raising pressure, and transmits the heat released from cooling at the terminal end of the thermodynamic circulation indirectly to seawater, among them the demineralized water circulation is mainly to protect the printed circuit board heat exchanger used in the $CO_2$ cooler (5), or to apply a simplified system, in which the cooled heat from the terminal end of the power circulation is directly used to heat seawater by means of a heat exchanger;

natural low-temperature seawater is extracted to successively flow from the low-temperature side of the steam condenser (6*c*), the low-temperature condenser (32) in the middle-stage flash evaporator (13), the low-temperature condenser (22) in the first-stage flash evaporator (12) and the first-stage seawater pump (11*d*) to the $14^{th}$ 3-way valve (10*p*), the low-temperature side of the seawater preheater (6*b*), the low-temperature side of the seawater heater (6*a*), the first seawater tank (24) of the first-stage flash evaporator (12), the second-stage seawater pump (11*e*), the second seawater tank (34) of the middle-stage flash evaporator (13), the third-stage seawater pump (11*f*), the grilles (44) of the water distributor (43) of the final-stage flash evaporator (14) and the third seawater tank (45), then is discharged from the fourth-stage seawater pump (11*g*) to finish concentrating seawater, and the $CO_2$ fluid in correspondence to the above processes successively passes through several processes of absorbing heat, absorbing heat, absorbing heat, raising pressure, flow splitting, absorbing heat, absorbing heat, flash concentration, raising pressure, flash concentration, raising pressure, dilatate flash concentration and raising pressure, so as to achieve the processes of absorbing heat and low-pressure flash concentration.

6. The flexible power plant based on supercritical carbon dioxide power circulation in combination with seawater desalination according to claim 5, wherein the first-stage flash evaporator (12) is composed of five parts: a first housing (21), a first low-temperature condenser (22), a first condensate water pan (23), the first seawater tank (24), and the second-stage seawater pump (11*e*), the first-stage flash evaporator (12) includes 6 interfaces, that is, a first low-temperature seawater inlet (25*a*), a first low-temperature seawater outlet (25*b*), a first water vapor outlet (25*c*), a first fresh water outlet (25*d*), a first high-temperature seawater inlet (25*e*) and a first high-temperature seawater outlet (25*f*), among them, pebbles piled in the first seawater tank (24) enhance gas velocity, and the first fresh water outlet (25*d*) led from the bottom of the first condensate water pan (23) is used to discharge condensate water;

the water vapor flashed from the first-stage flash evaporator (12) contacts the first low-temperature condenser (22) in the first-stage flash evaporator (12), then condenses into fresh water, which is collected by the first condensate water pan (23) in the first-stage flash evaporator (12), and finally flows convergently in the fresh water storing tank (15); the rest steam flows into the middle-stage flash evaporator (13) and mixes with the water vapor flashed from the middle-stage flash evaporator (13), then contacts the low-temperature condenser (32) in the middle-stage flash evaporator (13), and condenses into fresh water, which is collected by the second condensate water pan (33) in the middle-stage flash evaporator (13), and finally flows convergently in the fresh water storing tank (15); the remaining steam mixes with the water vapor flashed from the dilated final-stage flash evaporator (14) via the $15^{th}$ 3-way valve (10*q*), then enters the high-temperature side of the steam condenser (6c) to release heat and condense into fresh water, which finally flows into the fresh water storing tank (15);

the middle-stage flash evaporator (13) is composed of five parts: a second housing (31), a second low-temperature condenser (32), a second condensate water pan (33), the second seawater tank (34), and the third-stage seawater pump (11f), and the middle-stage flash evaporator (13) includes 6 interfaces, that is, a second low-temperature seawater inlet (35a), a second low-temperature seawater outlet (35b), a second water vapor outlet (35c), a second fresh water outlet (35d), a second high-temperature seawater inlet (35e) and a second high-temperature seawater outlet (35f), among them, pebbles piled in the second seawater tank (34) enhance gas velocity, and the second fresh water outlet (35d) led from the bottom of the second condensate water pan (33) is used to discharge condensate water; the middle-stage flash evaporator (13) is different from the first-stage flash evaporator (12) in the respect of its increase or decrease in number according to the desalination process, and the second seawater tank (34) in the middle-stage flash evaporator (13) can be equipped with a flue gas remaining heat recycling device according to the desalination process, which utilizes the flue gas discharged from the high-temperature side of the seawater heater (6a).

7. The flexible power plant based on supercritical carbon dioxide power circulation in combination with seawater desalination according to claim 5, wherein the final-stage flash evaporator (14) is composed of six parts: a third housing (41), a fan (42), the water distributor (43), the grilles (44), the third seawater tank (45), and the third-stage seawater pump (11f), and the fan (42) is used to enhance disturbance and raise the evaporation rate of seawater on the surface of the grilles (44);

the fresh water storage tank (15) is provided with a sealed chamber (51), the upper part of which is equipped with an exhaust valve (52) to regularly provide negative pressure for the fresh water side of the desalination process;

the middle-stage flash evaporator (13) can increase or decrease in number according to the evaporation volume required by the process, and the $15^{th}$ 3-way valve (10q), the $16^{th}$ 3-way valve (10r) and the $17^{th}$ three-way valve (10s) are used to bypass the final-stage flash evaporator (14).

8. The flexible power plant based on supercritical carbon dioxide power circulation in combination with seawater desalination according to claim 1, wherein said control system includes a $1^{st}$ 3-way valve (10a), a $2^{nd}$ 3-way valve (10b), a $3^{rd}$ 3-way valve (10c), a $4^{th}$ 3-way valve (10d), a $5^{th}$ 3-way valve (10e), a $6^{th}$ 3-way valve (10g), a $7^{th}$ 3-way valve (10h), a $8^{th}$ 3-way valve (10i), a $9^{th}$ 3-way valve (10j), a $10^{th}$ 3-way valve (10k), a $11^{th}$ 3-way valve (10l), a $12^{th}$ 3-way valve (10m), a $13^{th}$ 3-way valve (10n), a $14^{th}$ 3-way valve (10p), a $15^{th}$ 3-way valve (10q), a $16^{th}$ 3-way valve (10r), a $17^{th}$ 3-way valve (10s), a first bypass valve (10f), a second bypass valve (10o), a first intermediate working medium pump (11a), a second intermediate working medium pump (11b), a first-stage seawater pump (11d), a second-stage seawater pump (11e), a third-stage seawater pump (11f), a fourth-stage seawater pump (11g), a frequency conversion actuator equipped for compressors, a controller (9) and accessory power electronics facilities.

9. A operation method of the flexible power plant based on supercritical carbon dioxide power circulation in combination with seawater desalination according to claim 7, comprising:

Operating Mode 1 being selected by the power plant, when a power grid requires the power plant to operate at a full load, at this time, the power grid requires the power plant to output at a full load or the power plant actively enters a highest output mode at a highest electricity price, while the seawater desalination process enters a minimal power consumption mode; wherein a controller (9) adjusts the actuators which are various valves and pumps and pipelines to achieve the process steps of enabling the boiler (7) to provide heat for the first-stage supercritical $CO_2$ Brayton circulation by the $CO_2$ heater (3a) and provide heat for the second-stage supercritical $CO_2$ Brayton circulation by the $CO_2$ preheater (3b), and the first-stage and second-stage supercritical $CO_2$ Brayton circulations to jointly operate and share the second-stage back heater (4b), so as to achieve the flow allocation of the two Brayton circulations via the $1^{st}$ 3-way valve (10a) and the $2^{nd}$ 3-way valve (10b), enabling one part of the heat source used in the desalination process comes from a low-grade heat source that cannot be utilized by the thermodynamic circulation to transmit to seawater via the $CO_2$ cooler (5) and the seawater preheater (6b), and the other part as the flue gas discharged by the boiler (7) to further raise the seawater's temperature via the seawater heater (6a), and meanwhile enabling the first-stage flash evaporator (12) and the middle-stage flash evaporator (13) to acting as a water vapor generating device; wherein, in this operating mode, the output of the thermodynamic system can be adjusted within a reasonable range by means of the boiler (7), the heat storing tank (8) and the $CO_2$ circulation flow;

Operating Mode 2 being selected by the power plant, when a power grid requires the power plant to reduce output, at this time, the power grid requires the power plant to reduce output or the power plant actively enters a higher output mode at a higher electricity price, while the seawater desalination process enters a median power consumption mode, wherein the controller (9) adjusts the actuators and the pipelines to achieve the process steps of enabling the boiler (7) to provide heat for the first-stage supercritical $CO_2$ Brayton circulation by means of the $CO_2$ heater (3a) and the second-stage supercritical $CO_2$ Brayton circulation to be bypassed, enabling one part of the heat source used in the desalination process comes from a low-grade heat source that cannot be utilized by the thermodynamic circulation to transmit to seawater via the $CO_2$ cooler (5) and the seawater preheater (6b), and the other part as the flue gas discharged by the boiler (7) to further raise the seawater's temperature via the seawater heater (6a), meanwhile enabling the first-stage flash evaporator (12), the middle-stage flash evaporator (13) and the final-stage flash evaporator (14) to acting as a water vapor generating device, and enabling the fan (42) in the final-stage flash evaporator (14) to be in a constant closing state; wherein, in this operating mode, the output of the thermodynamic system can be adjusted within a reasonable range by means of the boiler (7), the heat storing tank (8) and the $CO_2$ circulation flow, meanwhile seawater flow appropriately increases to enhance freshwater production;

Operating Mode 3 being selected by the power plant, when a power grid requires the power plant to continue reducing output, at this time, the power grid requires the power plant to further reduce output or the power plant actively enters a low output mode at a median electricity price, while the seawater desalination process enters a median power consumption mode; wherein the controller (9) adjusts the actuators and the pipelines to achieve the process steps of enabling the boiler (7) to provide heat for the first-stage supercritical $CO_2$ Brayton circulation by means of the $CO_2$ heater (3a), the second-stage supercritical $CO_2$ Brayton circulation to be bypassed, and the second-stage back heater (4b) further to be bypassed based on Operating Mode 2, enabling one part of the heat source used in the desalination process comes from a low-grade heat source that cannot be utilized by the thermodynamic circulation to transmit to seawater via the $CO_2$ cooler (5) and the seawater preheater (6b), and the other part as the flue gas discharged by the boiler (7) to further raise the seawater's temperature via the seawater heater (6a), meanwhile enabling the first-stage flash evaporator (12), the middle-stage flash evaporator (13) and the final-stage flash evaporator (14) to acting as a water vapor generating device, and enabling the fan (42) in the final-stage flash evaporator (14) to be in a constant closing state; wherein, in this operating mode, the output of the thermodynamic system can be adjusted within a reasonable range by means of the boiler (7), the heat storing tank (8) and the $CO_2$ circulation flow, meanwhile seawater flow appropriately increases to enhance freshwater production; and Operating Mode 4 being selected by the power plant, when a power grid requires the power plant to operate in the lowest load state, at this time, the power grid requires the power plant to output in a low load state or the power plant actively enters a lowest output mode at a low electricity price, while the seawater desalination process enters a lowest power consumption mode; wherein the controller (9) adjusts the actuators and the pipelines to achieve the process steps of enabling the boiler (7) to provide heat for the second-stage supercritical $CO_2$ Brayton circulation by means of the $CO_2$ preheater (3b), the original system to rebuild into the second-stage supercritical $CO_2$ Brayton circulation overlapping the $CO_2$ cooling circulation, and the first-stage supercritical $CO_2$ Brayton circulation to be bypassed, enabling one part of the heat source used in the desalination process comes from a low-grade heat source that cannot be utilized by the thermodynamic circulation to transmit to seawater via the $CO_2$ cooler (5) and the seawater preheater (6b), and the other part as the flue gas discharged by the boiler (7) to further raise the seawater's temperature via the seawater heater (6a), meanwhile enabling the first-stage flash evaporator (12), the middle-stage flash evaporator (13) and the final-stage flash evaporator (14) to acting as a water vapor generating device, and enabling the fan (42) in the final-stage flash evaporator (14) to be in a constant closing state; wherein, in this operating mode, the output of the thermodynamic system can be adjusted within a reasonable range by means of the boiler (7), the heat storing tank (8) and the $CO_2$ circulation flow, meanwhile freshwater production further rises.

\* \* \* \* \*